(12) United States Patent
Edsall et al.

(10) Patent No.: US 7,492,765 B2
(45) Date of Patent: Feb. 17, 2009

(54) METHODS AND DEVICES FOR NETWORKING BLADE SERVERS

(75) Inventors: Thomas Edsall, Cupertino, CA (US); Claudio Desanti, Kensington, CA (US)

(73) Assignee: Cisco Technology Inc., San Jose, CA (US)

( * ) Notice: Subject to any disclaimer, the term of this patent is extended or adjusted under 35 U.S.C. 154(b) by 644 days.

(21) Appl. No.: 11/154,372

(22) Filed: Jun. 15, 2005

(65) Prior Publication Data

US 2007/0002883 A1 Jan. 4, 2007

(51) Int. Cl.
*H04L 12/28* (2006.01)
(52) U.S. Cl. ................ 370/389; 370/392; 370/401
(58) Field of Classification Search ............ None
See application file for complete search history.

(56) References Cited

U.S. PATENT DOCUMENTS

| | | | |
|---|---|---|---|
| 6,629,156 B1 | 9/2003 | Odenwald et al. | |
| 2003/0103504 A1 | 6/2003 | Dugan et al. | 370/392 |
| 2003/0135620 A1 | 7/2003 | Dugan et al. | 709/226 |
| 2005/0102437 A1 | 5/2005 | Pettey et al. | |
| 2005/0105904 A1 | 5/2005 | Varanasi et al. | |
| 2005/0198523 A1* | 9/2005 | Shanbhag et al. | 713/200 |
| 2006/0023707 A1* | 2/2006 | Makishima et al. | 370/389 |
| 2006/0034276 A1* | 2/2006 | Saklecha et al. | 370/389 |

FOREIGN PATENT DOCUMENTS

WO WO2006/138290 12/2006

OTHER PUBLICATIONS

PCT International Search Report and Written Opinion mailed in related International Application No. PCT/US2006/022957, 12 pages, Feb. 6, 2008.

* cited by examiner

*Primary Examiner*—Duc C Ho
(74) *Attorney, Agent, or Firm*—Weaver Austin Villeneuve Sampson LLP

(57) ABSTRACT

Some embodiments of the present invention provide blade servers having blade switches that function as switches in the data plane, but do not have a Domain_ID. Control plane switching functions are performed by a fabric switch (e.g., a core switch) to which the blade server is attached. A fabric switch to which a blade switch is attached may perform address assignment functions for blades of the blade server. The blade switch preferably converts FLOGI requests to FDISC requests that are forwarded to an attached fabric switch. Some implementations provide for the multiple fabric switches, all of which are configured for communication with at least one blade switch, to establish and maintain the state of a virtual Domain_ID.

18 Claims, 18 Drawing Sheets

METHODS AND DEVICES FOR NETWORKING BLADE SERVERS

BACKGROUND OF THE INVENTION

1. Field of the Invention

The present invention relates to communication networks. More particularly, the present invention relates to the use of blade servers in communication networks, including but not limited to Fiber Channel ("FC") networks.

2. Description of the Related Art

A recent trend in the data center is to deploy blade servers. Blade servers generally have a modular chassis and a set of central processing unit ("CPU") blades plugged into that chassis. In addition to CPU blades, there are typically 2 or more network interface blades. Some of these network interface blades are used for FC connectivity, generally to a storage area network ("SAN"), and some of them are for Ethernet connectivity. The benefits of blade servers include greater rack density, simplified interconnect, and lower cost.

The deployment of a typical blade server is illustrated in FIG. 1. Blade server 105 includes blades 110, each of which is interconnected with each of switches 115, 120, 125 and 130, all within a single chassis 135. To other devices in network 100 (e.g., to host device 142), each of blades 110 may appear to be an individual device. Each of blades 110 may provide, for example, the functionality of a server that is operating independently of the other blades 110 within chassis 135.

In this example, Ethernet switches 115 and 120 provide redundant connections with enterprise network 140 and Internet 145. FC switches 125 and 130 provide redundant connections with SAN 150 and storage devices 155. Blade servers 106, 107 and 108 are similarly configured.

As shown in FIG. 1, blade servers configured for communication with a SAN normally include two FC switches. FC networks can support a limited number of total switches, which is normally a maximum of 239. Some popular switch implementations have even more severe restrictions on the number of switches in the SAN, e.g., a maximum of 32 switches. These maximum numbers include core switches, edge switches and FC switches within blade servers. It can readily be seen that such limitations are causing data centers to quickly reach the total FC switch scaling limit.

In addition to the foregoing issues, including additional switches creates additional administrative overhead. Often information technology ("IT") departments are organized such that those that administer the SAN are not the same people that administer the servers. The server administrators may not have the skills necessary to administer the SAN and vice versa.

With the blade server architecture, since switches and servers are in the same chassis, this division of responsibility is difficult to maintain. Generally, the server administrator takes responsibility for the blade server, including the switch embedded inside it. However, if the server administrator lacks sufficient expertise for SAN management, the server administrator may do something to a blade server switch that will adversely affect the rest of the SAN.

Even if a network administrator is competent to administer both a SAN and servers, the number of additional FC switches introduced by blade servers in a network creates an administrative burden. Normally, the only switches that a SAN administrator will manage are those of the switch fabric. However, with prior art blade servers attached to the SAN, each FC switch of every blade server has its own parameters that must be managed. From a management perspective, this effectively extends the switch fabric that must be managed to the switches in the blade servers.

Moreover, if an FC switch in a blade server can only be configured for a fabric of, e.g., 32 switches, this minimum will apply to the entire fabric even if the core and edge switches could be configured for a fabric of, e.g., 239 switches. In other words, the switch having the lowest maximum will control the maximum number of switches that can be included in the fabric.

It would be desirable to address at least some of the foregoing limitations of the prior art.

SUMMARY OF THE INVENTION

Some embodiments of the present invention provide blade servers having components that function as switches in the data plane, but do not function as normal switches in the control plane and do not have a separate Domain _ID. Such components may sometimes be referred to herein as "blade switches" or "satellite switches" even though the blade switches do not function as switches in the control plane. Instead, most control plane switching functions are performed by a fabric switch (e.g., a core switch) to which the blade switch is attached. According to some such embodiments, a blade switch functions as a switch in the data plane and functions as a multiplexer in the control plane.

According to some such implementations of the invention, a fabric switch to which a blade switch is attached performs address assignment functions for blades of the blade server. In some such implementations, the blade server initializes and obtains a first address for the port to which a fabric switch is connected via a fabric log-in ("FLOGI") process. The blade server converts FLOGI requests received from the blades to fabric discovery ("FDISC") requests having no indicated source ID. The FDISC requests are forwarded to the fabric switch and addresses are thereby obtained for the blades from the fabric switch.

Although some implementations of the invention provide for a blade switch to be in communication with a single fabric switch, alternative implementations provide for a blade switch to be in communication with multiple fabric switches. Some preferred implementations provide for the multiple fabric switches to establish and maintain the state of a virtual Domain _ID for this purpose.

Some embodiments of the invention provide a blade switch, comprising a first port in communication with a first blade of a plurality of blades, a second port configured as an N_Port and a logic device. The logic device is configured to do the following: receive a first FLOGI request from the first blade via the first port; convert the first FLOGI request to a first FDISC request; forward the FDISC request to the F_Port of a fabric switch that is in communication with the second port; and receive an FDISC ACCEPT from the attached fabric switch. The FDISC ACCEPT includes the address for the first blade. The logic device should be configured to designate the N_Port as a default exit port.

Alternative embodiments of the invention provide a network, comprising a plurality of fabric switches and a blade server. The blade server includes at least one blade switch and a plurality of blades. The blade switch has a first port in communication with a second port of a first fabric switch of the plurality of fabric switches. The first port is configured as an N_Port and the second port is configured as an F_Port.

The blade switch also includes a third port in communication with a first blade of the plurality of blades and a logic device. The logic device may be configured to do the following: receive a first FLOGI request from the first blade via the third port; convert the first FLOGI request to a first FDISC request; and forward the FDISC request to the second port of the first fabric switch via the first port.

The first fabric switch may be configured to receive the first FDISC request via the second port; determine a first address of a Domain_ID that will be used in an FDISC ACCEPT responsive to the FDISC request; form the FDISC ACCEPT; and send the FDISC ACCEPT to the first port of the blade switch. The FDISC ACCEPT includes the first address.

In some embodiments of the network, F_Ports of M cooperating fabric switches, including the first fabric switch, may be configured for communication with M N_Ports of the blade switch. The M cooperating fabric switches form a virtual Domain_ID. The first fabric switch may determine a first address of the virtual Domain_ID that will be used in the FDISC ACCEPT. Prior to sending the FDISC ACCEPT, the first fabric switch preferably notifies all other cooperating fabric switches of the first address that will be used in the FDISC ACCEPT.

Some implementations of the invention provide a method for controlling a blade switch. The method includes these steps: receiving a first FLOGI request from a first blade of a blade server; converting the first FLOGI request to a first FDISC request; and obtaining a first address for the first blade via the first FDISC request. The obtaining step may involve forwarding the first FDISC request from an N_Port of the blade switch to an F_Port of an attached fabric switch and receiving an FDISC ACCEPT from the attached fabric switch. The FDISC ACCEPT includes the first address for the first blade. The method preferably includes the step of designating an N_Port of the blade switch to which a fabric switch is attached as a default exit port.

The method may also include these steps: receiving a $2^{nd}$ through $N^{th}$ FLOGI requests from $2^{nd}$ through $N^{th}$ blades; converting the $2^{nd}$ through $N^{th}$ requests to $2^{nd}$ through $N^{th}$ FDISC requests; and obtaining $2^{nd}$ through $N^{th}$ addresses for the $2^{nd}$ through $N^{th}$ blades via the $2^{nd}$ through $N^{th}$ FDISC requests. The method can include the step of populating a forwarding table of the blade switch with the first through $N^{th}$ addresses.

The method may involve forming a virtual Domain_ID via cooperation between a plurality of fabric switches that are configured for communication with the blade switch. The obtaining step can involve assigning an address of the virtual Domain_ID as the first address. The assigning step may be performed by one of the plurality of fabric switches.

Some implementations of the invention provide a method of controlling a blade server. The method includes these steps: forming a virtual Domain_ID via cooperation between a plurality of fabric switches that are configured for communication with a blade switch of a blade server; assigning a plurality of addresses of the virtual Domain_ID to the blade server; and updating a forwarding table of each of the plurality of fabric switches according to the addresses assigned in the assigning step. The method preferably includes the step of designating at least one N_Port of the blade switch by which the plurality of fabric switches are attached to the blade switch as a default exit port.

The method may also include these steps: receiving, by an F_Port of one of the plurality of fabric switches, an address request from an N_Port of a blade switch; determining an address of the virtual Domain_ID that will be used in a response to the address request; notifying the other switches of the plurality of fabric switches of the address that will be used in the response to the address request; and sending the response to the blade switch.

Some alternative embodiments of the invention provide a blade server that includes a plurality of blades and at least one blade switch. The blade switch includes these elements: a first port in communication with a first blade of the plurality of blades; a second port configured as an N_Port; and a logic device. The logic device is configured to do the following: receive a first FLOGI request from the first blade via the first port; convert the first FLOGI request to a first FDISC request; forward the FDISC request to an F_Port of a fabric switch that is in communication with the second port; and obtain a first address from the fabric switch for the first blade via the first FDISC request.

DETAILED DESCRIPTION OF THE INVENTION

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Figure 1:
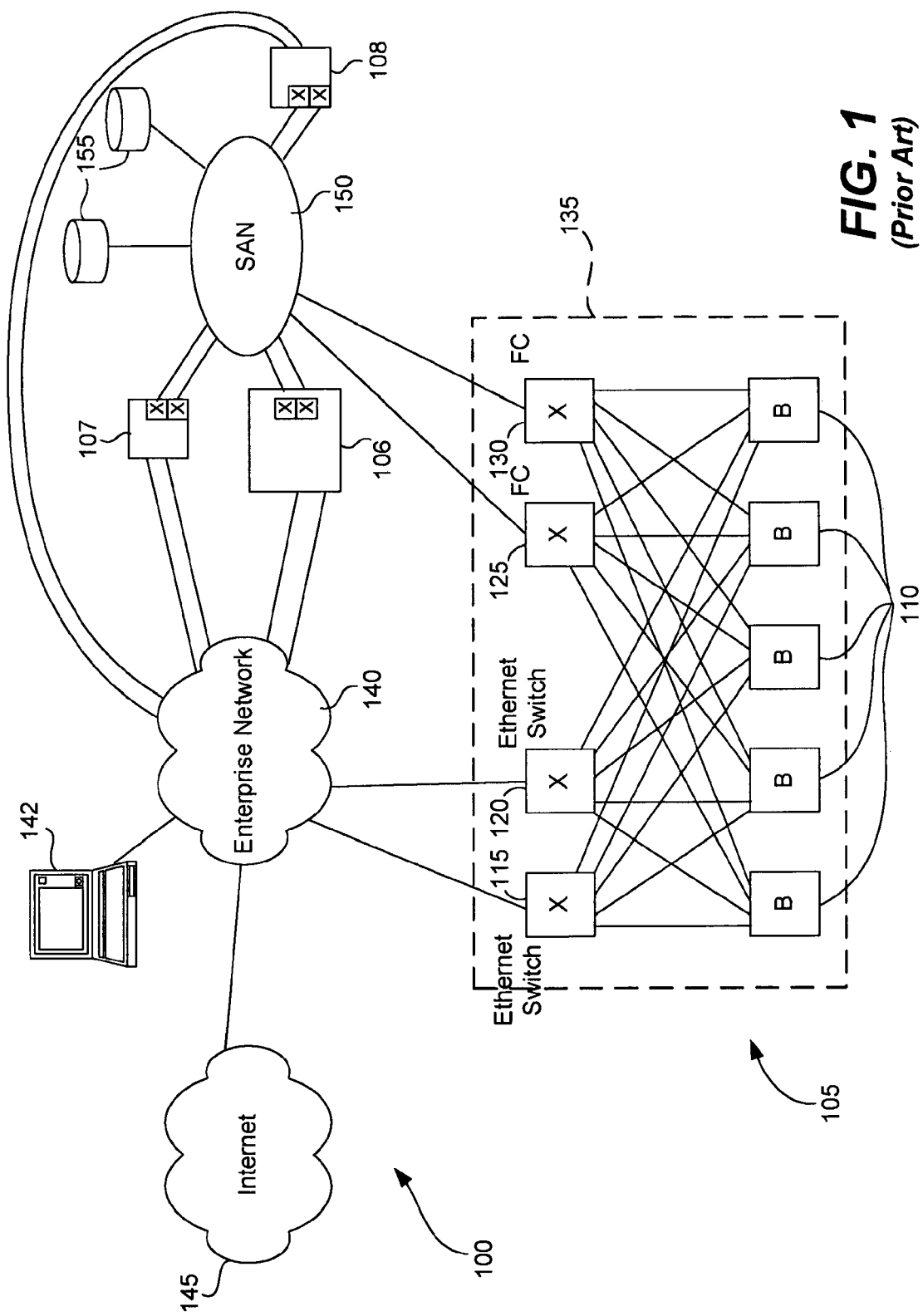
FIG. 1 is a network diagram that depicts the deployment of a typical blade server.
Figure 2:
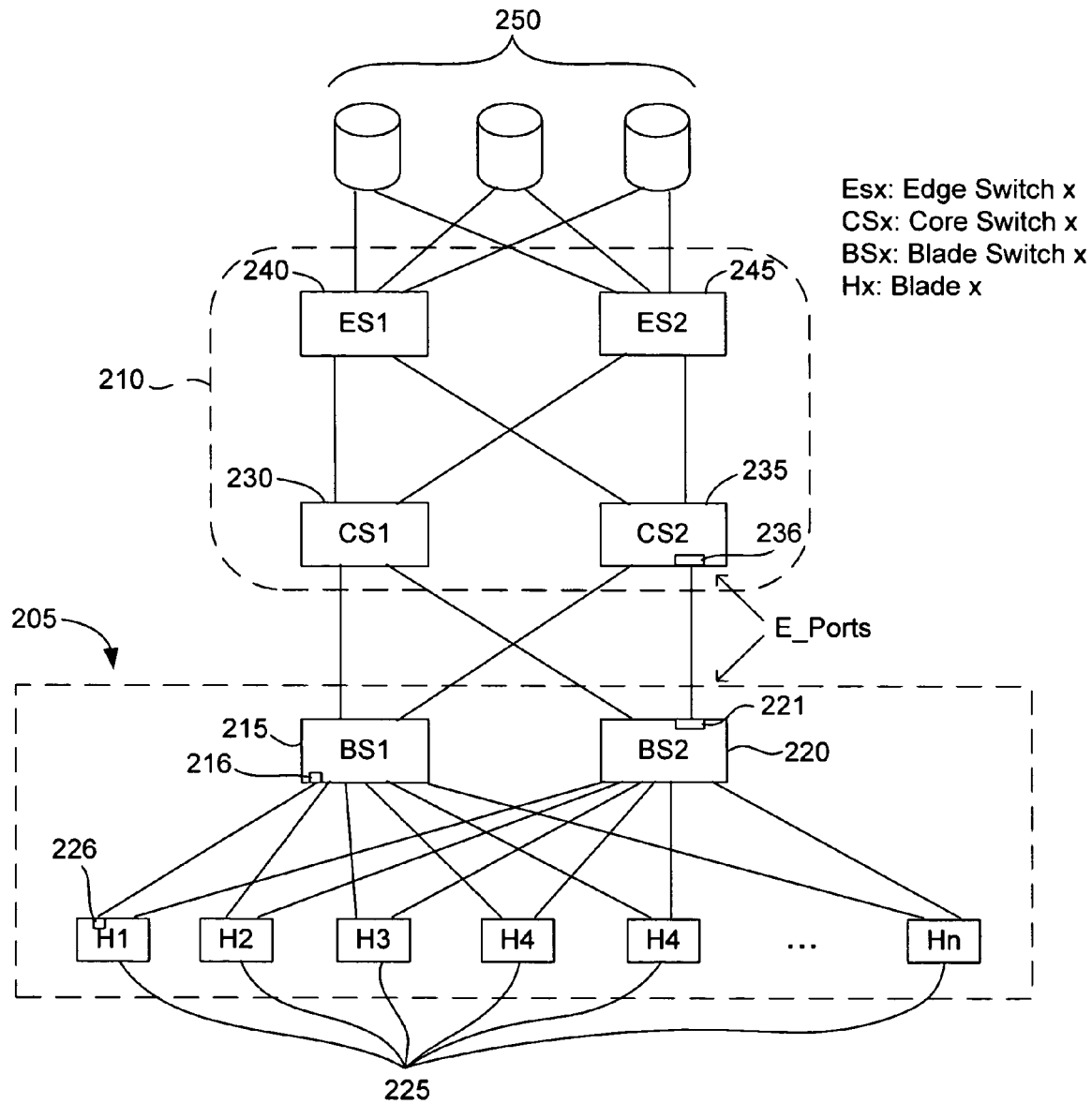
FIG. 2 is a network diagram that provides more detail regarding the deployment of a typical blade server in a SAN.

FIG. 2 is a simplified network diagram that illustrates conventional blade server 205 connected with SAN 210. Blade server 205 includes switches 215 and 220, both of which are redundantly connected to each of N blades 225. SAN 210 includes core switches 230 and 235, both of which are redundantly connected to switches 215 and 220. SAN 210 also includes edge switches 240 and 245, both of which are redundantly connected to each of the core switches and storage devices 250.

According to the FC protocol, E_Ports connect switches to other switches. Therefore, port 221 of switch 220 and port 236 of core switch 235 are both E_Ports. An F_Port connects a switch to an N_Port of a "node," e.g., of a host device such as a blade. Therefore, port 216 is an F_Port and port 226 is an N_Port.

An E_Port must support the full suite of switch-to-switch protocols for E_Ports, such as those needed to obtain a Domain_ID, to compute paths for routing frames, to administer access for zoning, etc. However, F_Ports do not need to do all these things. Aside from receiving and sending frames, the main control function of an F_Port is address assignment. This is done via responses to FLOGI and FDISC requests.

Therefore, some embodiments of the present invention provide blade servers having blade switches that function as switches in the data plane, but do not function as switches in the control plane and do not have a separate Domain_ID. Control plane switching functions are performed via an F_Port of a fabric switch (e.g., a core switch) attached to a Port of a blade switch configured as an N_Port.

Figure 3A:
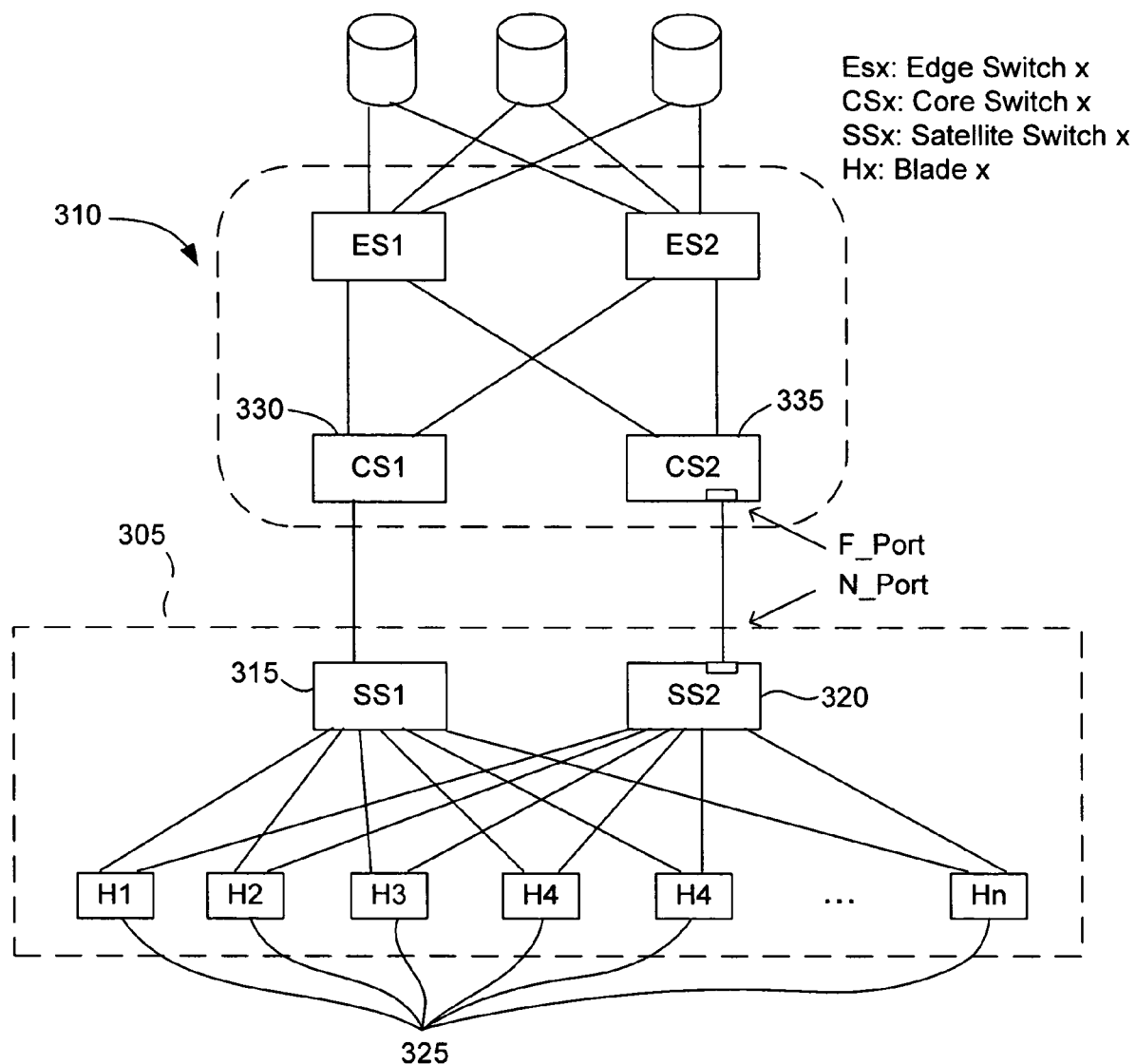
FIG. 3A is a network diagram that illustrates a blade server configured according to some embodiments of the present invention and deployed in a SAN.

One such configuration is shown in the simplified network diagram of FIG. 3A, which illustrates blade server 305 of the present invention connected with SAN 310. Blade server 305 includes blade switches 315 and 320, which are redundantly connected to each of N blades 325. As with SAN 210, SAN 310 provides redundant connectivity between core switches, edge switches and storage devices.

However, in this exemplary embodiment core switches 330 and 335 are not redundantly connected to switches 315 and 320. Moreover, F_Ports of core switches 330 and 335 are connected to N_Ports of switches 315 and 320. Addresses are assigned to the components of blade server 305 via one of core switches 330 and 335. One method of address assignment will be described below with reference to the flow chart of FIG. 6.

Figure 3B:
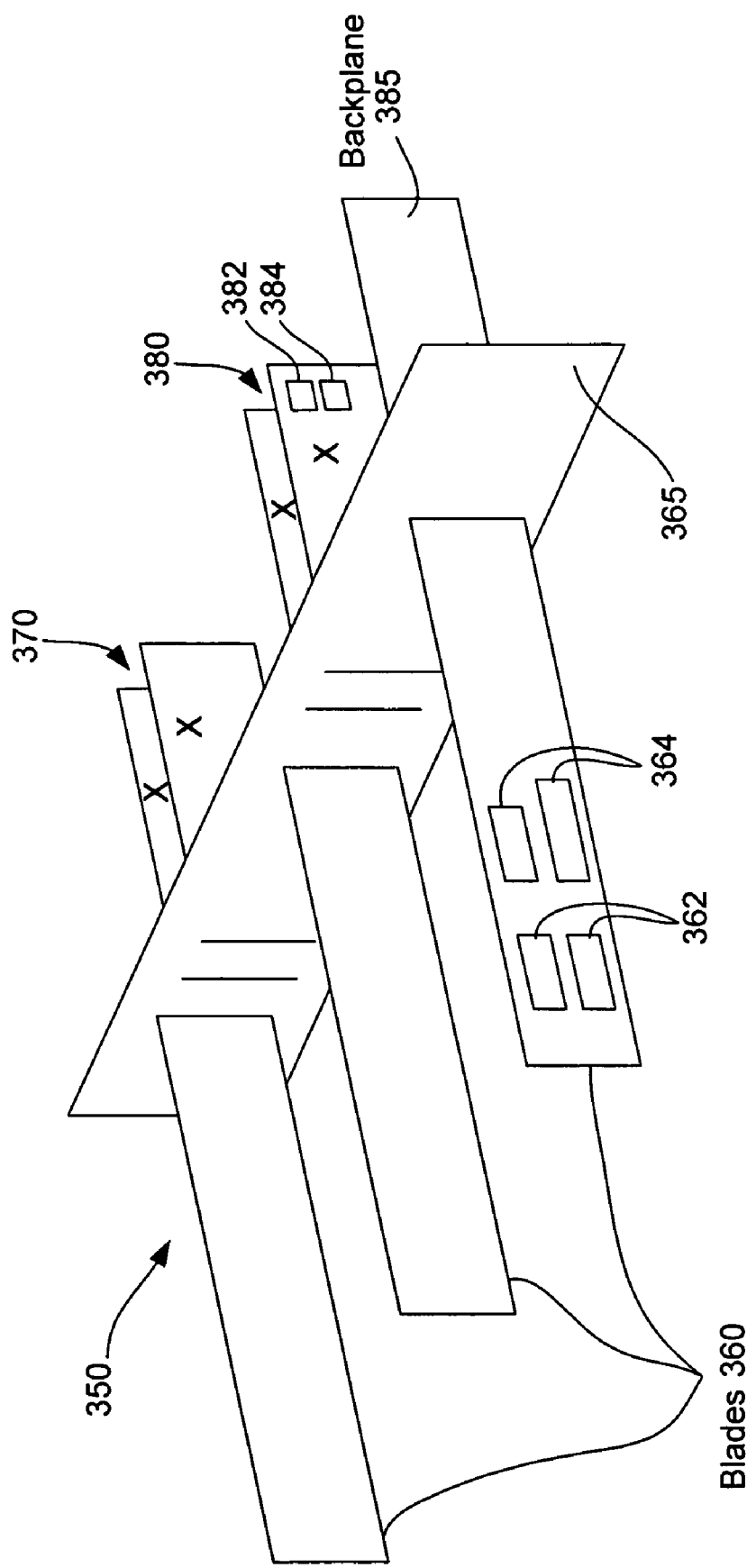
FIG. 3B is a perspective diagram of some components of a blade server that can be configured according to some implementations of the present invention.

FIG. 3B is a perspective diagram that depicts some components of a blade server 350 that may be configured according to some implementations of the present invention. In this example, each of blades 360 provides the functionality of an individual server and contains the processor(s) 362, memory devices 364, and networking components necessary to run server applications. Processors 362 may be, for example, Intel Xeon™ or AMD Opteron™ processors. Memory devices 364 may include solid state memory, such as a PC3200 DDR, and one or more disk drives.

The number of processors and memory devices shown in FIG. 3B is purely illustrative; for example, currently-implemented blades typically have between 1 and 4 processors. Similarly, the number of blades is merely exemplary. Currently, up to 16 blades may be deployed in a single chassis and that number is expected to increase.

Blade server 350 preferably includes both Ethernet switches 370 and FC switches 380. Ethernet switches 370 may be, for example, Cisco Gigabit Ethernet Switch Modules. Ethernet switches 370 and FC switches 380 include the necessary processors, memory, etc. (such as processor 382 and memory 384) to perform networking functions for blade server 350, including but not limited to the functions described herein. Backplane 365 provides connectivity between the various components of blade server 350.

Blade server 350 also includes an enclosure (not shown) for housing the components shown in FIG. 3B, as well as other components (such as cooling fans). Power supply 385 provides and controls the power for blade server 350.

Figure 4:
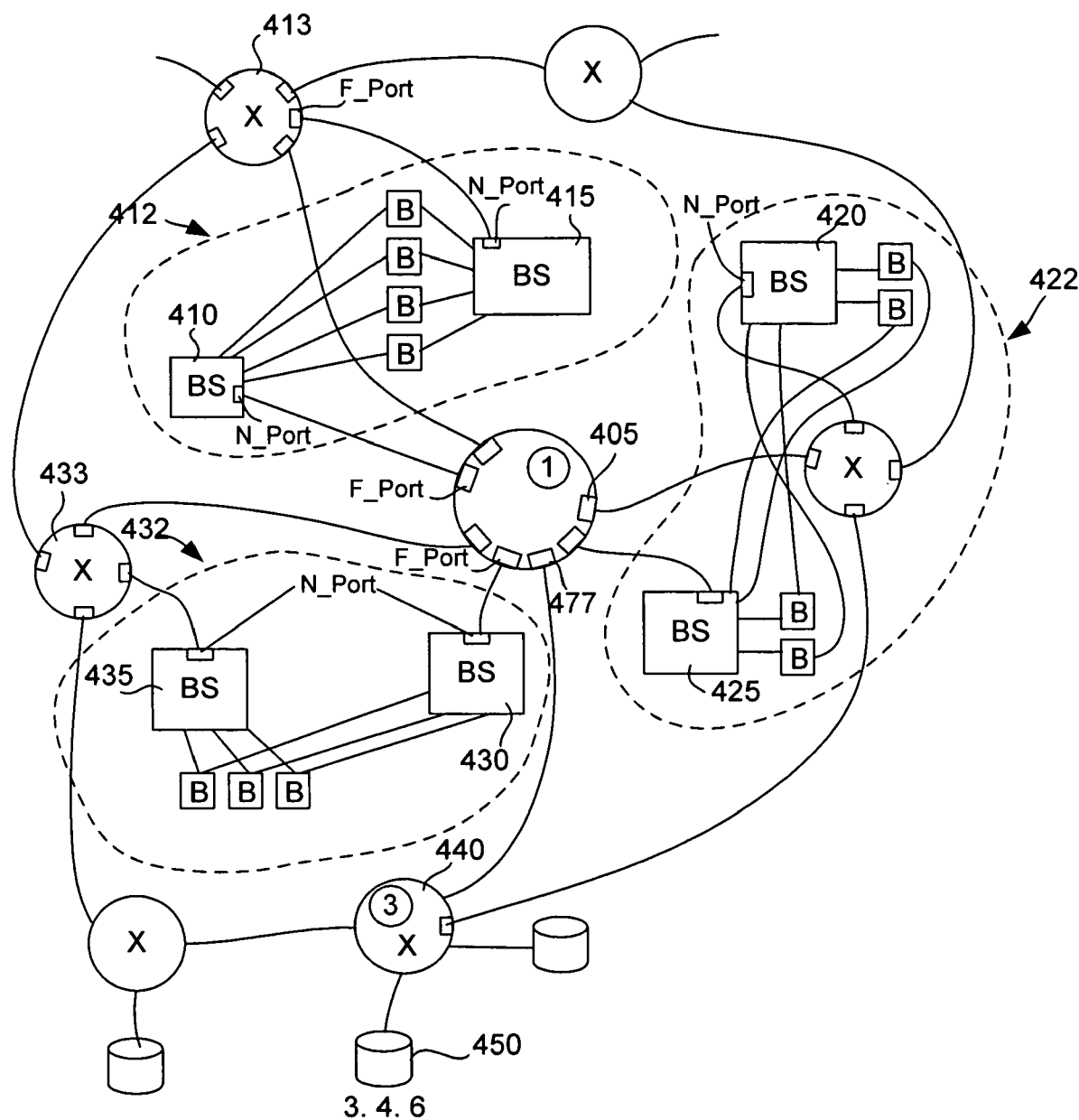
FIG. 4 is a logical network diagram illustrating a fabric switch of a SAN that provides addresses to a plurality of attached blade switches configured according to some embodiments of the present invention.

As shown in the logical network diagram of FIG. 4, a fabric switch (such as core switch 405) may be connected to a number of blade switches that will not act as switches in the control plane, but rather as multiplexers. In this example, blade switches 410 and 415 are part of blade server 412, blade switches 420 and 425 are part of blade server 422, and blade switches 430 and 435 are part of blade server 432.

In this example, only one blade switch of a blade server is attached to any given fabric switch. Here, blade switches 410, 425 and 430 are attached to core switch 405. Accordingly, core switch 405 will assign addresses from its Domain_ID (Domain_ID=1) to all of attached blade switches 410, 425 and 430. Similarly, the Domain_ID of core switch 413 will be used for assigning addresses to blade switch 415 and the Domain_ID of core switch 433 will be used for assigning addresses to blade switch 435.

The portion of the switch fabric illustrated in FIG. 4 includes edge switch 440, which has a Domain_ID of 3. As known by those of skill in the art, the 3 numbers of an FC address correspond to the Domain_ID, the area ID and the host ID. In this example, attached storage device 450 has been assigned an address of 3.4.6 by edge switch 440 during a prior FLOGI exchange.

The assignment of addresses to a blade server and associated blades will now be described with reference to FIGS. 5-7. A blade switch port connected to a Port of a fabric switch will present itself to the fabric switch as an N_Port and will send an FLOGI to the fabric switch upon initializing.

Figure 5:
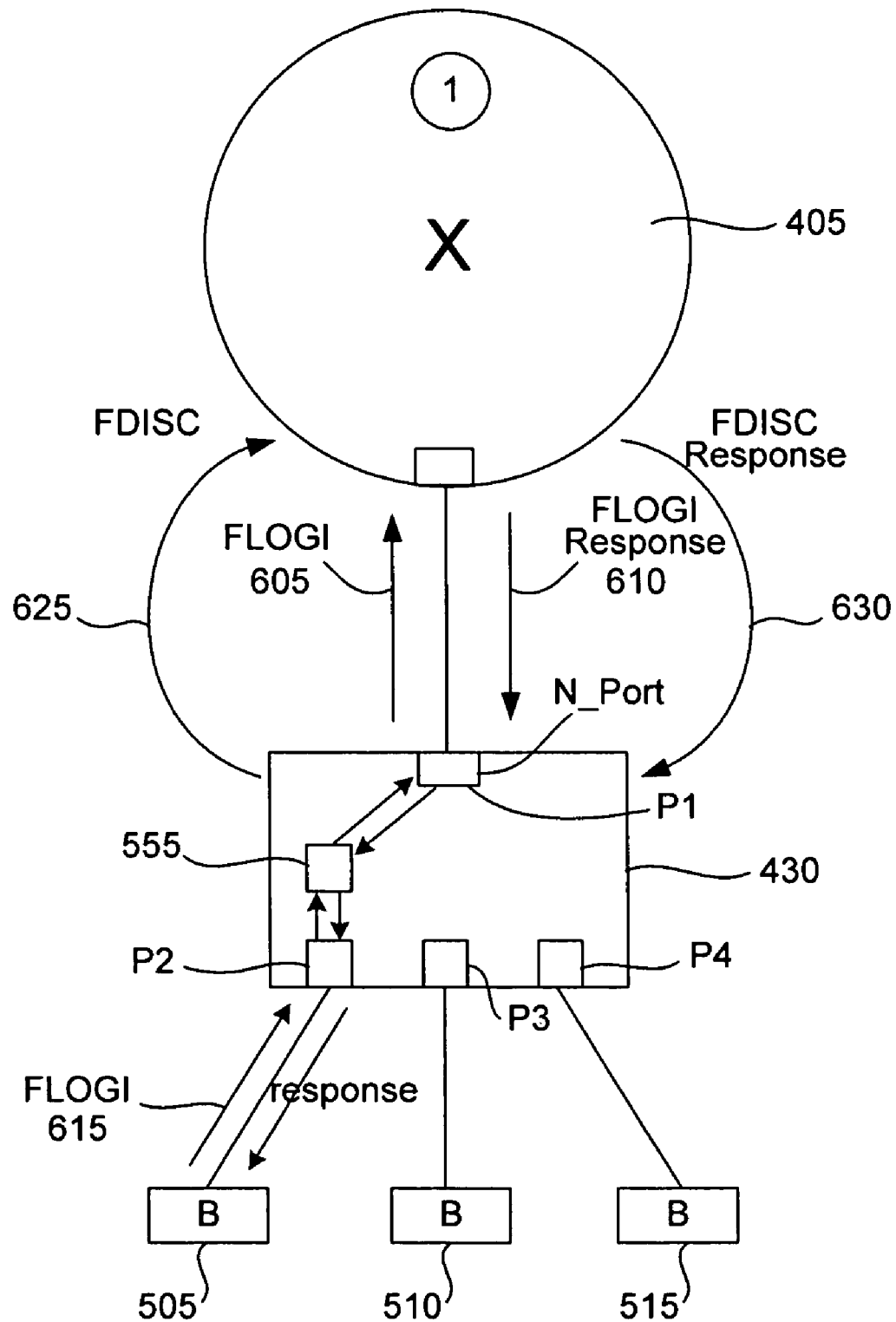
FIG. 5 illustrates a portion of the logical network diagram of FIG. 4 and the flow of FLOGI and FDISC requests and responses according to some implementations of the invention.
Figure 6:
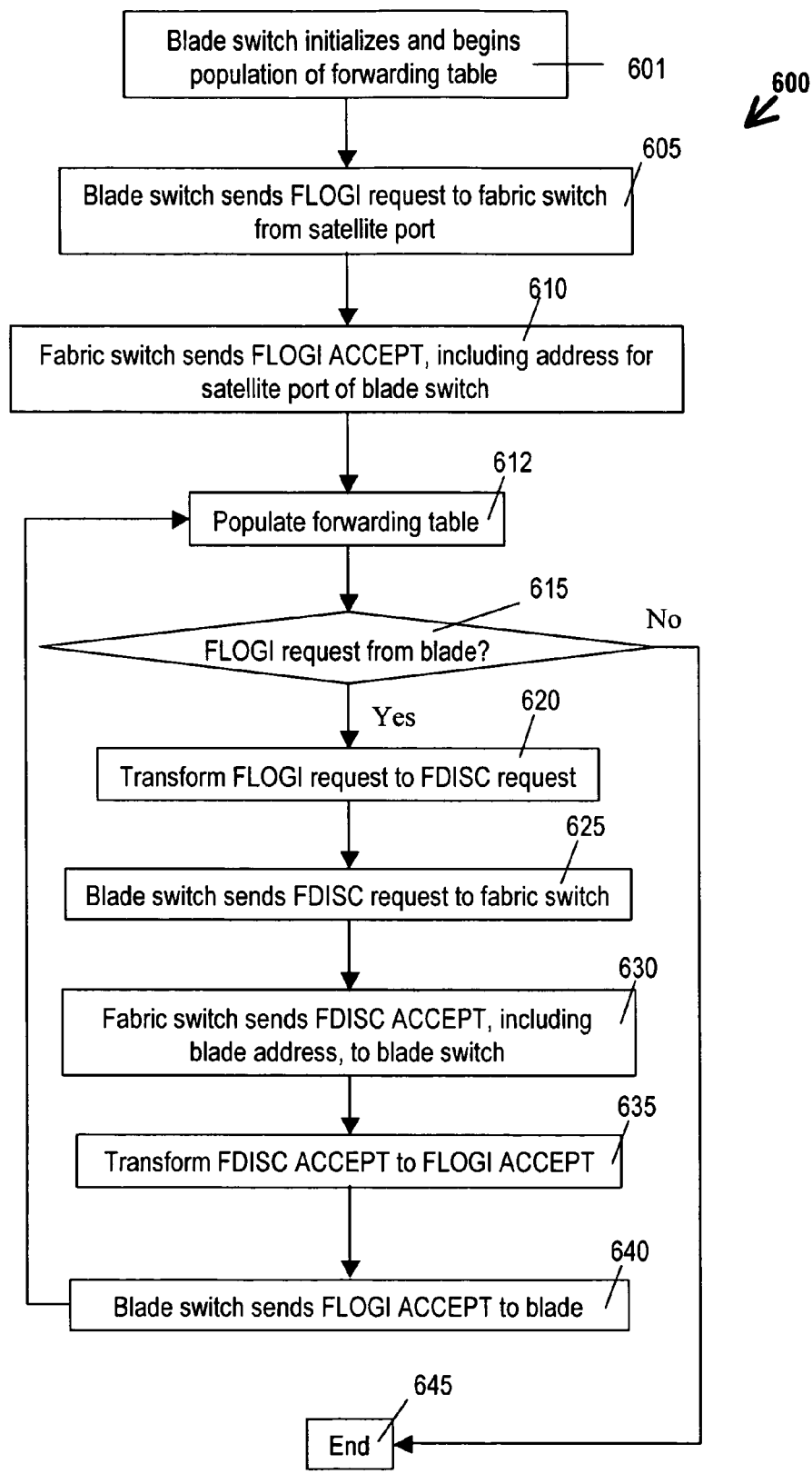
FIG. 6 is a flow chart that outlines method 600 of the present invention.

FIG. 5 illustrates one "spoke" of the logical diagram of FIG. 4, which includes blade switch 430 and core switch 405. This spoke has been enlarged so that the individual components, as well as arrows indicating various FLOGI and FDISC communications, can readily be distinguished. These communications are examples of some of the steps indicated in method 600 of the flow chart shown in FIG. 6. Accordingly, these arrows have been labeled with numbers corresponding to the step numbers of method 600.

The steps of the methods shown and described herein, including method 600, are not necessarily performed in the order indicated. Moreover, some methods that are within the scope of the present invention involve more or fewer steps than indicated herein.

In step 601 of method 600, a blade switch (here, blade switch 430) initializes. Among other things, the initialization process involves the beginning of the process of populating the blade switch's forwarding table, which associates destination addresses with exit ports.

Figure 7:
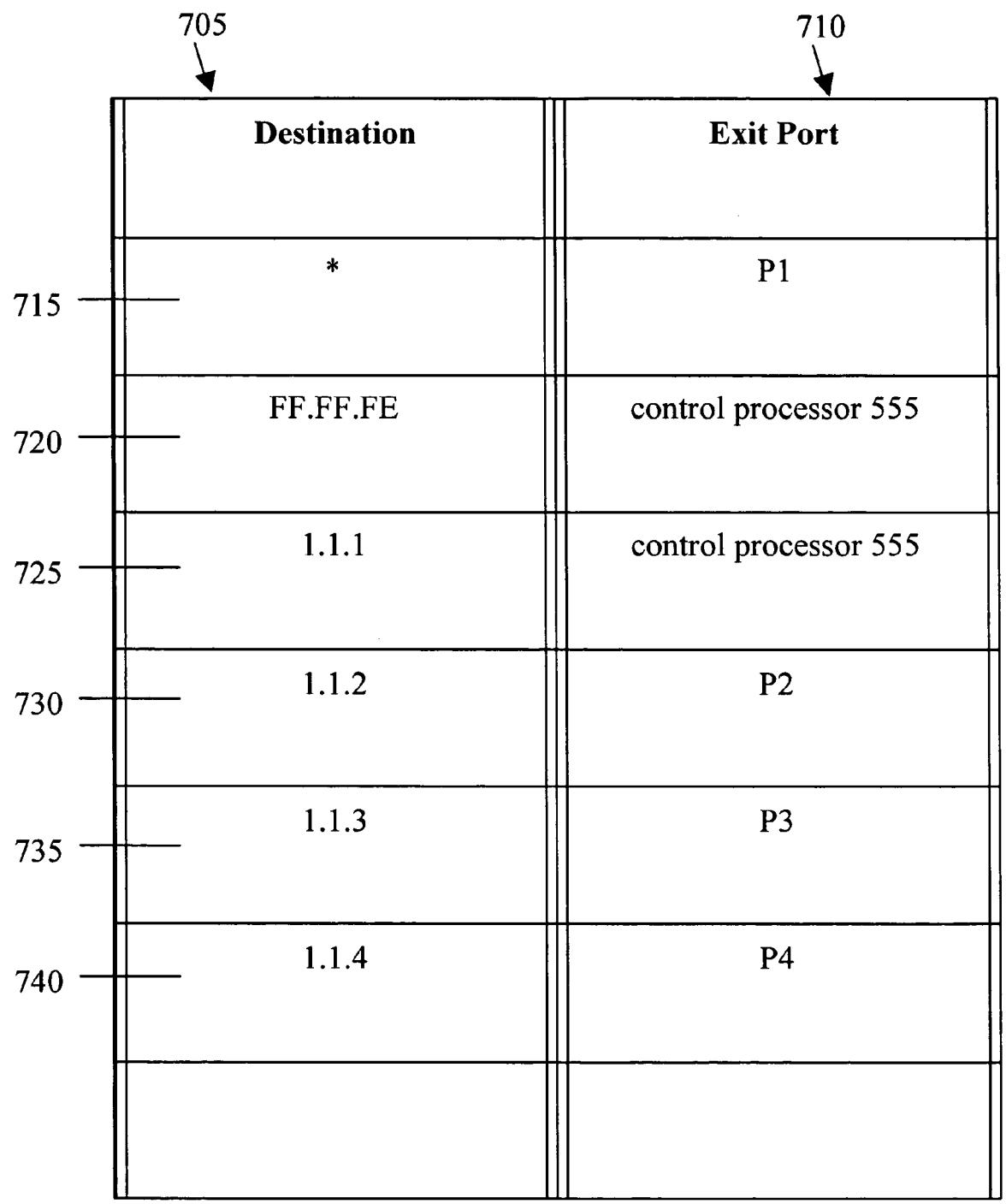
FIG. 7 depicts a forwarding table of a blade switch that has been populated according to method 600.

A simplified depiction of such a forwarding table is shown in FIG. 7. Forwarding table 700 includes destination field 705 and exit port field 710. The initial steps of populating forwarding table 700 include indicating a default route for FC frames with an unrecognized destination address ("D_ID") in the header. Accordingly, default route entry 715 is formed, having a "wild card" symbol in default route field 705 and indicating port P1, the N_Port attached to core switch 405, in exit port field 710.

Moreover, entry 720 of forwarding table 700 is populated with a destination address of FF.FF.FE, which is known as F_Port controller. The corresponding "exit port" is designated as that of a control processor of the blade switch (here, control processor 555). This will cause FLOGI requests received from attached blades to be sent to the blade switch's control processor for processing, e.g., according to the present invention.

In step 605, blade switch 430 sends an FLOGI request to an attached fabric switch (here, core switch 405) via port P1, which is configured as an N_Port. The N_Port through which the blade switch will be communicating with the core switch will be configured as a satellite port.

Core switch 405 determines an address for blade switch 430 (which is 1.1.1 in this example), forms an FLOGI ACCEPT and returns the FLOGI ACCEPT. (Step 610.) In addition to an address, an FLOGI response also contains fabric parameters that are necessary to properly access the FC fabric, for example, the maximum frame size that can be sent into the fabric.

In step 612, the address received from core switch 405 is added to forwarding table 700. As indicated by entry 725, the received address (1.1.1) is associated with the control processor of the blade switch.

Sometimes, while operating, it may be desirable (or even necessary) for a host device in communication with an FC fabric to determine whether any fabric parameters have changed. An FDISC request was originally designed for an N_Port to rediscover/verify fabric properties. The response to an FDISC request will either verify the assumed parameters or indicate that they have changed. The host device may need to re-initialize and send an FLOGI request if the received parameters are not workable.

An N_Port normally sends its own N_Port_ID (previously obtained in response to an FLOGI request) with an FDISC request. However, if the FDISC request does not include an address (S_ID =0), it will be treated as a request for an additional address and one will be sent in the FDISC response.

The blades of a blade server (in this example, blades 505, 510 and 515) will each send FLOGI requests to the blade switch upon initializing. When the blade switch receives each FLOGI request (step 615), the FLOGI request will be sent to the blade switch's control processor (here, processor 555) according to entry 720 of the forwarding table. The control processor will convert the FLOGI request to an FDISC request (step 620), which the blade switch will send to the core switch without a source address (step 625). Each FDISC response (FDISC ACCEPT) will include an additional address for a blade (step 630). This address will be added to the blade switch's forwarding table and associated with the port to which the requesting blade is attached (step 612). The FDISC ACCEPT will be transformed by the control processor of the blade switch to an FLOGI ACCEPT (step 635), which is forwarded to the requesting blade. (Step 640.) The standard "Fiber Channel Framing and Signaling Interface (FC-FS)" (ANSI INCITS 373-2003) describes relevant information, including details of FLOGI and FDISC requests and responses (see, for example, sections 12.3.2.41 and 12.3.2.7), and is hereby incorporated by reference for all purposes.

In this example, the FLOGI request for blade 505 is received on port P2 and the address received for the corresponding FDISC request is 1.1.2. Accordingly, entry 730 of forwarding table 700 includes address 1.1.2 in field 705 and port P2 in field 710. Similarly, the FLOGI request for blade 510 is received on port P3 and the address received for the corresponding FDISC request is 1.1.3. Therefore, entry 735 of forwarding table 700 includes address 1.1.3 in field 705 and port P3 in field 710. In the same fashion, the FLOGI request for blade 515 is received on port P4 and the address received for the corresponding FDISC request is 1.1.4. Therefore, entry 740 of forwarding table 700 includes address 1.1.4 in field 705 and port P4 in field 710.

After initialization is completed, the blades may request additional N_Port_IDs by sending to the blade switch an FDISC request with S_ID =0. When the blade switch receives such a request, the FDISC request will be sent to the blade switch's control processor (here, processor 555) according to entry 720 of the forwarding table. The control processor will forward the FDISC request to the core switch. The FDISC response (FDISC ACCEPT) will include an additional address for a blade. This address will be added to the blade switch's forwarding table and associated with the port to which the requesting blade is attached. The FDISC ACCEPT will be then forwarded to the requesting blade.

A blade that acquired an additional N_Port_ID may release it by sending a LOGO from that N_Port_ID to the address FF.FF.FE. When the blade switch receives such a request, the LOGO request will be sent to the blade switch's control processor (here, processor 555) according to entry 720 of the forwarding table. The control processor will forward the LOGO request to the core switch. The LOGO request allows the core switch to remove the entry correspondent to that N_Port_ID from its forwarding table. Upon receiving the LOGO response (LOGO ACCEPT) the blade switch will forward it to the requesting blade and then will remove the N_Port_ID previously assigned to that blade from its forwarding table.

When a blade goes down, the blade switch notifies the attached core switch by sending a LOGO from the address that was assigned to that blade and updates its forwarding table by removing the corresponding entry. The LOGO request allows the core switch to remove the entry corresponding to that blade from its forwarding table.

The entry 720 of forwarding table 700 causes all requests sent by a blade to the FC address FF.FF.FE to be forwarded to the blade switch's control processor. While FLOGI, FDISC, and LOGO requests are detected and processed as described above, other types of requests are simply forwarded to the attached core switch, and the received responses are passed back to the requesting blades.

From the fabric switch's point of view, nothing new is happening. The only new software or hardware will be in the blade server, particularly in the blade switches. The attached fabric switch will respond entirely according to standard FC protocol for provisioning devices having virtual N_Ports. For this implementation, the fabric switch can be completely standard. However, some implementations of the invention that are described below will require modifications of the fabric switch's functionality.

Figure 8:
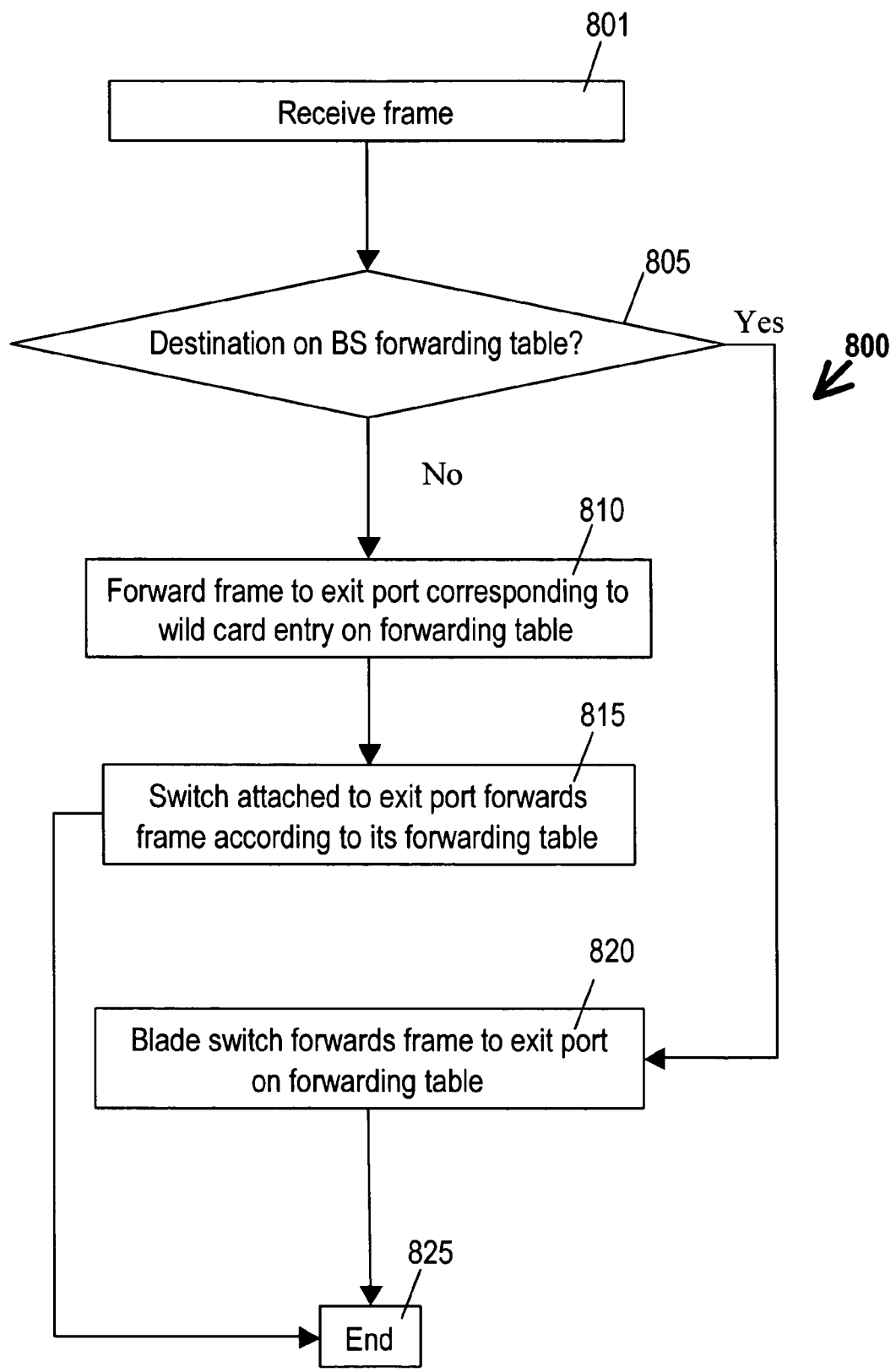
FIG. 8 is a flow chart that outlines method 800 of the present invention.

FIG. 8 is a flow chart regarding normal operation after the initialization process and population of the blade switch's forwarding table. In step 801, the blade switch (here, blade switch 430) receives an FC frame, e.g., from one of the attached blades. In step 805, it is determined whether the D_ID of the received FC frame is on the blade switch's forwarding table. If so, the blade switch forwards the frame to the exit port associated with the indicated destination address. (Step 820.)

When blade switch 430 receives a frame having a destination that is not on its forwarding table, the wildcard entry matches and the frame is forwarded to the exit port (here, the port connected to core switch 405) corresponding to that entry. (Step 810.) For example, if blade 505 sends a frame having a D_ID of 3.4.6, which is a storage device of domain 3, blade switch 405 would not recognize this destination address because it is not on forwarding table 700. Accordingly, blade switch 405 would forward the frame via the default exit port P1 indicated by the wildcard entry, which is the port to which core switch 405 is connected. (Step 810.)

Core switch 405 has a normal, complete forwarding table that includes other Domain_IDs for the FC fabric, including domain 3. Therefore, core switch 405 would forward the frame to switch 440 via exit port 477 (see FIG. 4). (Step 815.) Switch 440 would forward the frame to storage device 450 according to normal FC forwarding protocol.

It will be appreciated by those of skill in the art from the foregoing discussion that the blade switch acts as a switch in the data plane but does not "consume" a Domain_ID. Therefore, the extra switches in blade servers do not contribute to or exacerbate the problems associated with limited Domain_IDs.

Moreover, network management is simplified. A network manager can focus on managing higher-level functions such as zoning and access control that are performed by the fabric switches of a SAN; the blade switches do not need to be separately managed. Instead, management software can indicate that the blade switches are satellites of the fabric switch to which the blade switches are connected. For example, a displayed port of the fabric switch may indicate that there are a number of addresses associated with the attached device.

Figure 9A:
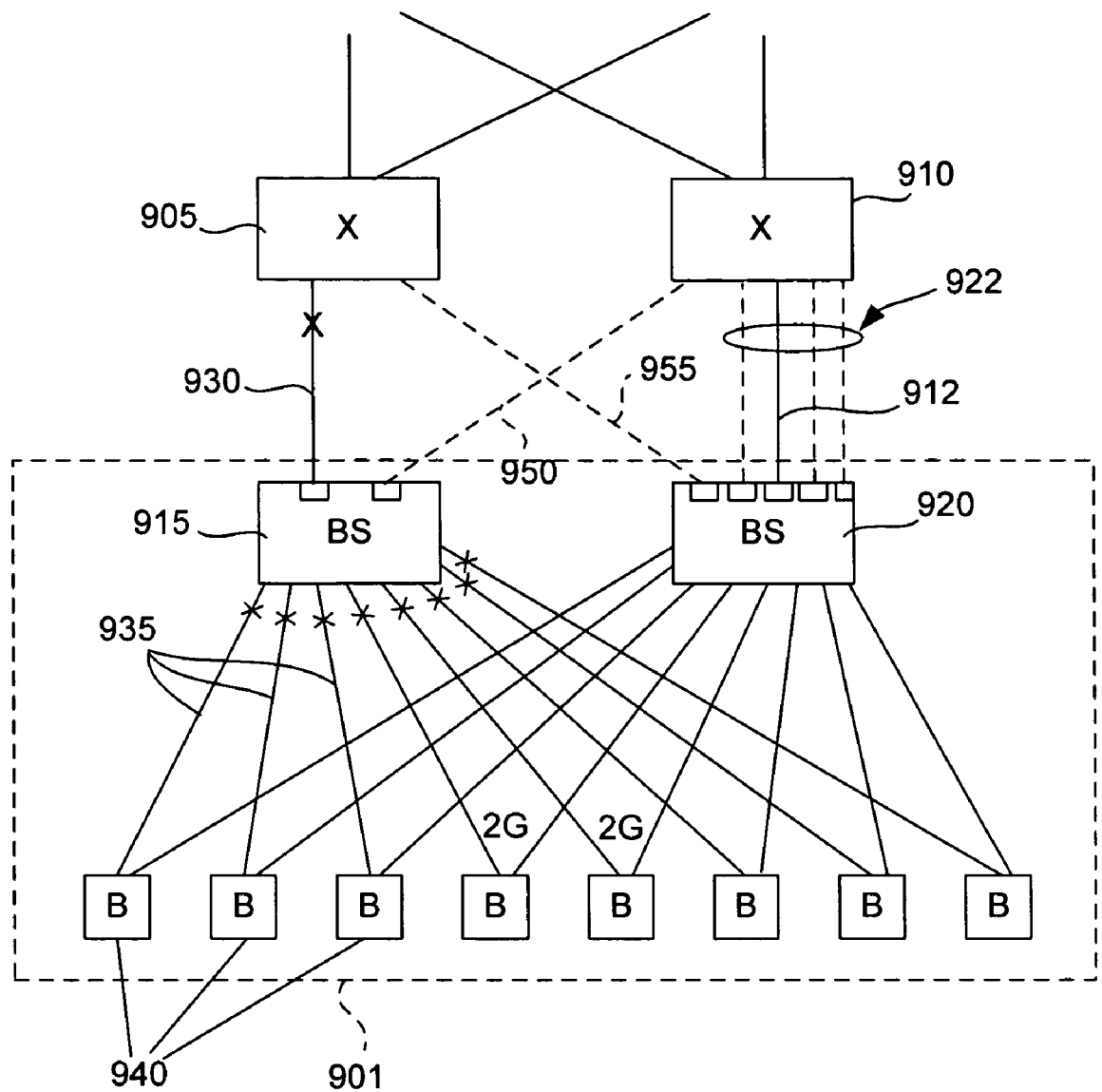
FIG. 9A illustrates some alternative interconnections of blade switches and fabric switches.
Figure 9B:
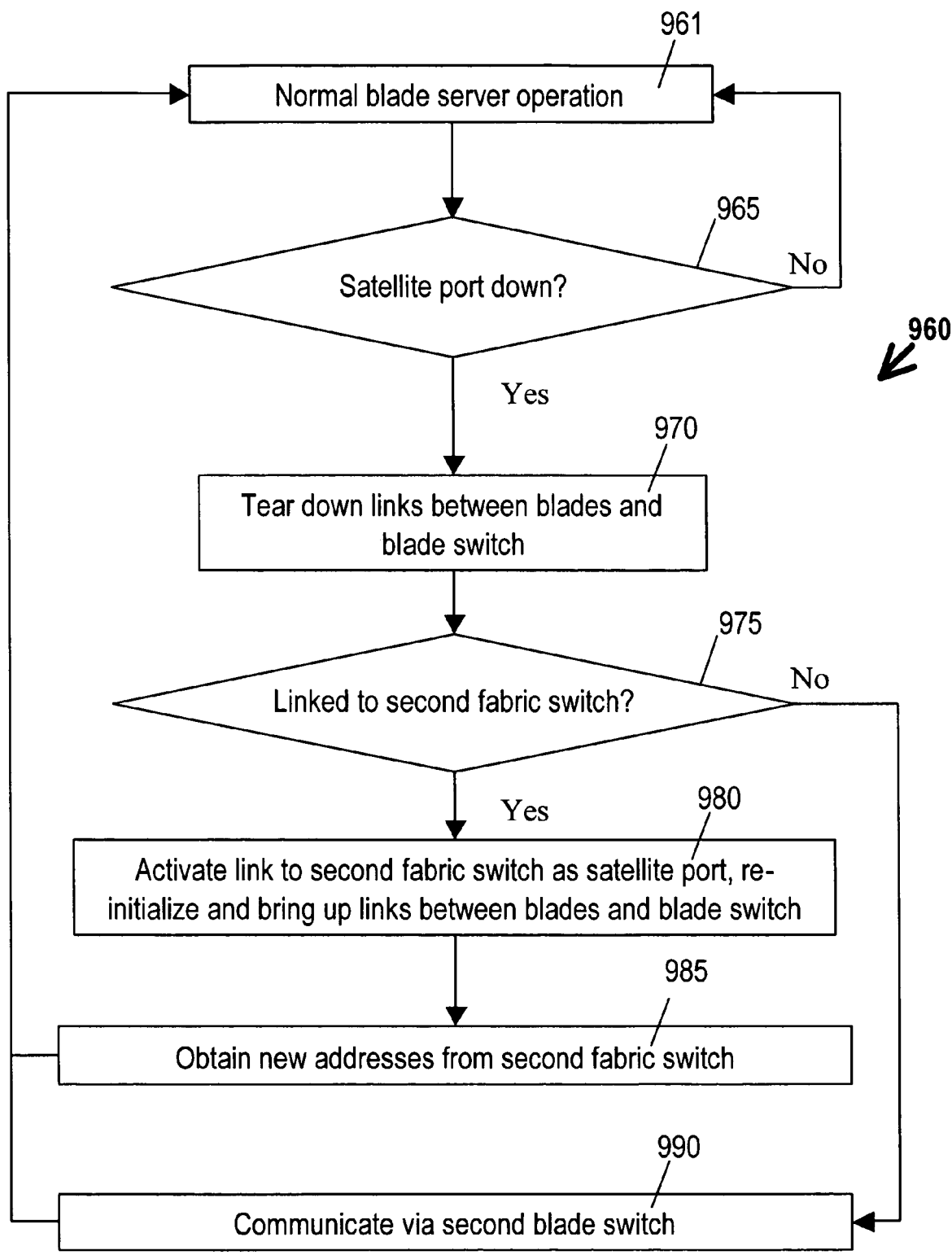
FIG. 9B is a flow chart that outlines a failover method according to the present invention.

Referring now to FIGS. 9A and 9B, a first failover implementation will be described. Blade server 901 of FIG. 9A includes blade switch 915 operating as described above, which is connected via link 930 with fabric switch 905. If link 930 between fabric switch 905 and blade switch 915 goes down (as determined in step 965 of FIG. 9B), all of links 935 between blade switch 915 and blades 940 are taken down. (Step 970.) All blades continue to operate properly through switch 920.

In this example, redundant connections 950 and 955 are not made. Accordingly, it is determined in step 975 that switch 915 is not linked to another fabric switch. Blades 940 will communicate with the fabric via blade switch 920 and fabric switch 910. (Step 990.)

However, in alternative implementations, redundant connections 950 and 955 are made but are not enabled except in the case of a fault. For example, in one alternative implementation, blade switch 915 would be constrained to send its FLOGI, FDISCs and other requests to a predetermined fabric switch, e.g., to switch 905 via link 930.

According to this implementation, it is determined in step 975 that blade switch 915 is attached to another fabric switch. A fault on link 930 would cause blade switch 915 to activate link 950 (step 985) as satellite port, re-initialize and bring links 935 back up. (Step 985.) Blade switch 915 would then send an FLOGI to fabric switch 910 via link 950. Blade switch 915 and blades 940 could then be provided with new addresses by fabric switch 910 as discussed elsewhere herein. (Step 990.)

In this example, link 912 connects blade switch 920 and fabric switch 910. However, in some implementations, multiple physical links are bundled or aggregated into a single virtual link. For example, there could be multiple physical links 922 that are virtualized as one logical link 912. Such implementations can be advantageous in various situations wherein a single physical link could case a bottleneck, e.g., if the link is not a high-speed link, if a blade server has numerous blades, etc.

Figure 10:
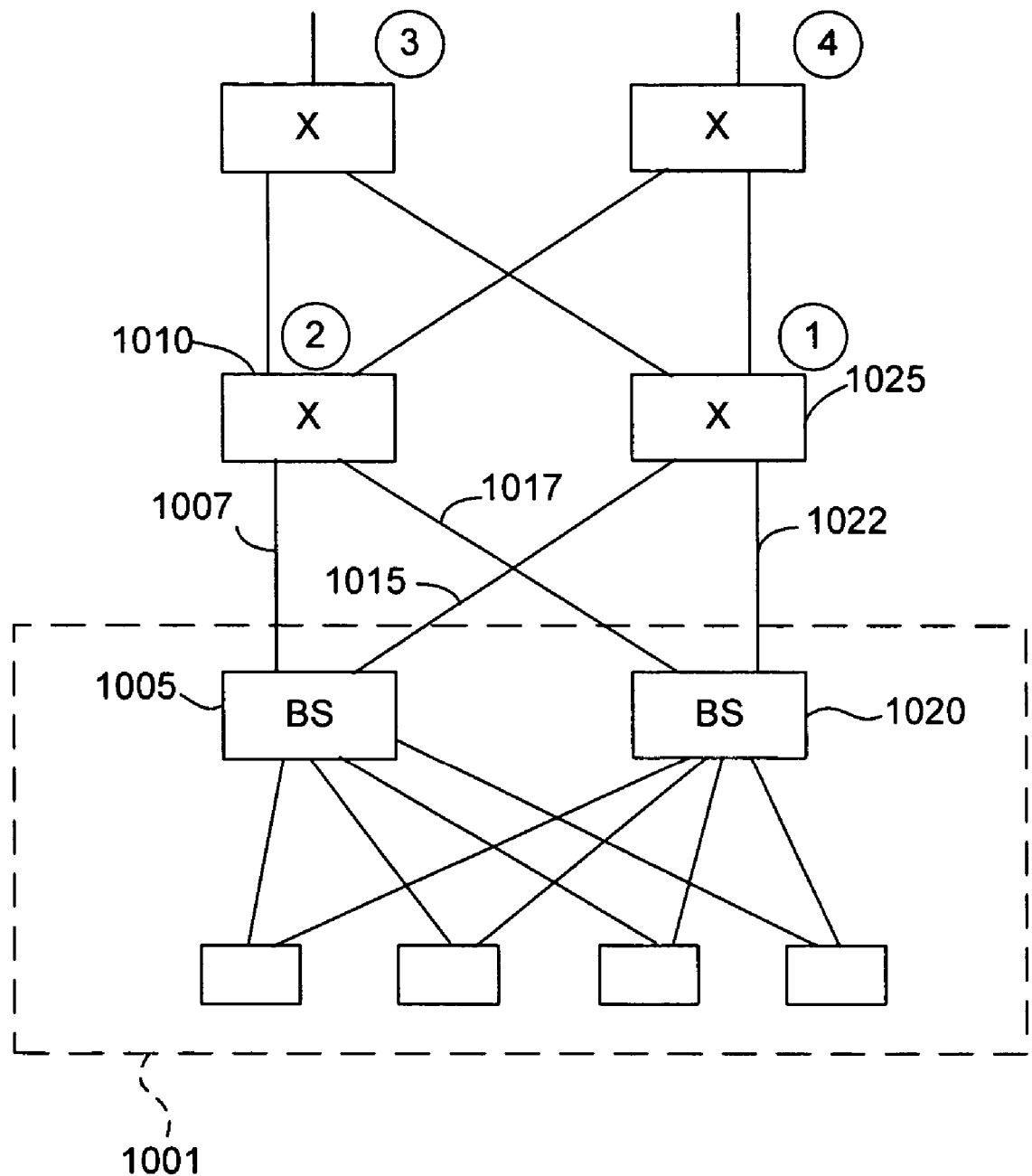
FIG. 10 illustrates another alternative for interconnecting blade switches and fabric switches.

FIG. 10 illustrates an embodiment in which blade switches have active links with more than one fabric switch. Here, blade switch 1005 is connected with fabric switch 1010 via link 1007 and blade switch 1020 is connected with fabric switch 1025 via link 1022. In addition, blade switch 1005 is connected with fabric switch 1025 via link 1015 and blade switch 1020 is connected with fabric switch 1010 via link 1017. In other implementations, blade server 1001 could enclose more than 2 fabric switches.

Figure 11:
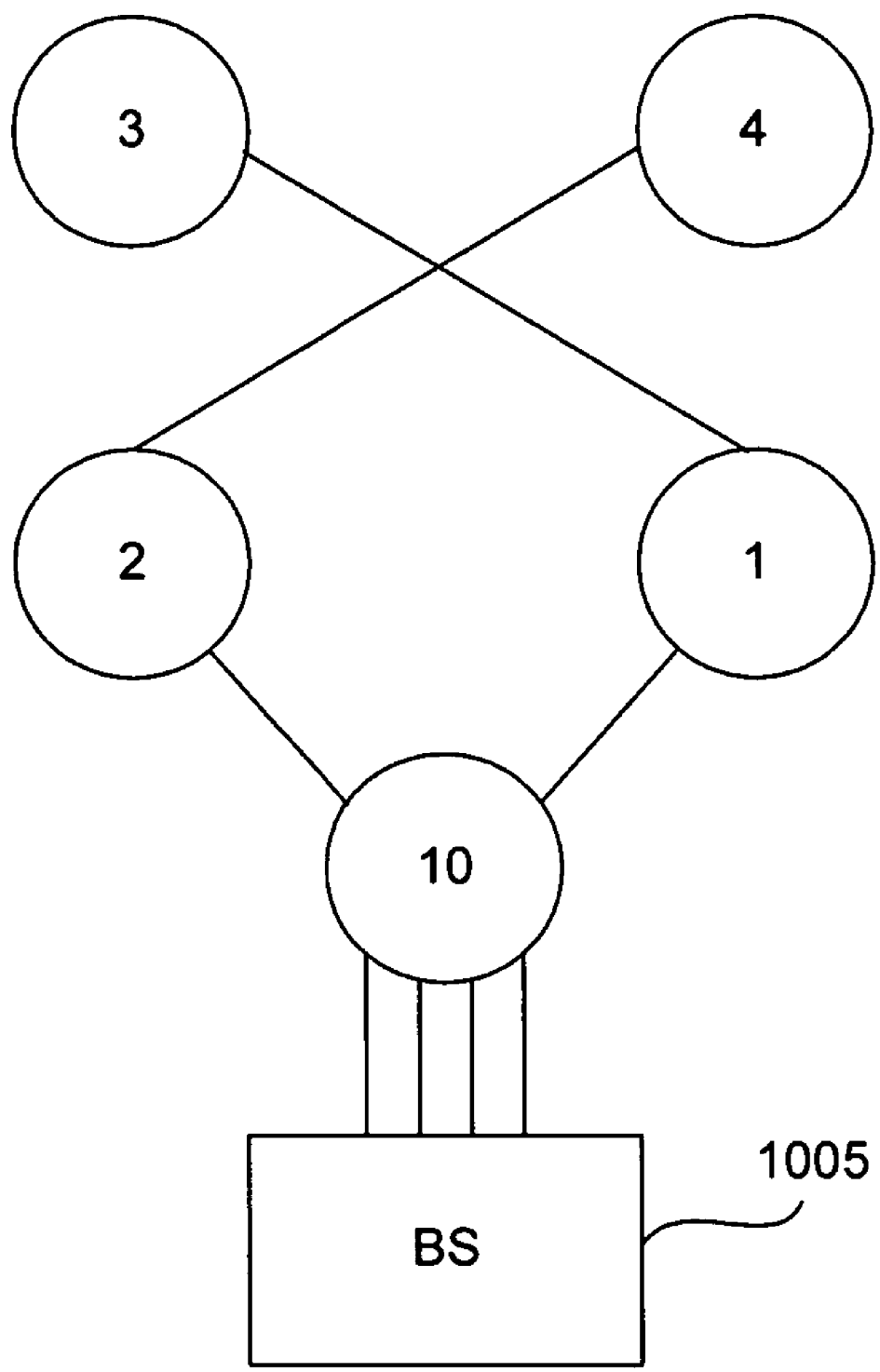
FIG. 11 is a logical diagram for an implementation of the invention involving a virtual Domain_ID.

FIG. 11 illustrates the logical Domain_IDs for the configuration shown in FIG. 10, plus a virtual Domain_ID 10 that has been established via the cooperation of fabric switches 1010 and 1025. (U.S. patent application Ser. No. 10/374,490, entitled "Method And Apparatus For Reliably And Asymmetrically Distributing Security Information Within A Fiber Channel Fabric" and filed on Feb. 25, 2003, which is hereby incorporated by reference, discusses the establishment of virtual Domain_IDs.) Because a virtual Domain_ID has been established, addresses can be assigned by either fabric switch 1010 or fabric switch 1025. If a link or a fabric switch fails, the virtual Domain_ID will still exist and no re-assignment of addresses needs to be made.

Figure 12:
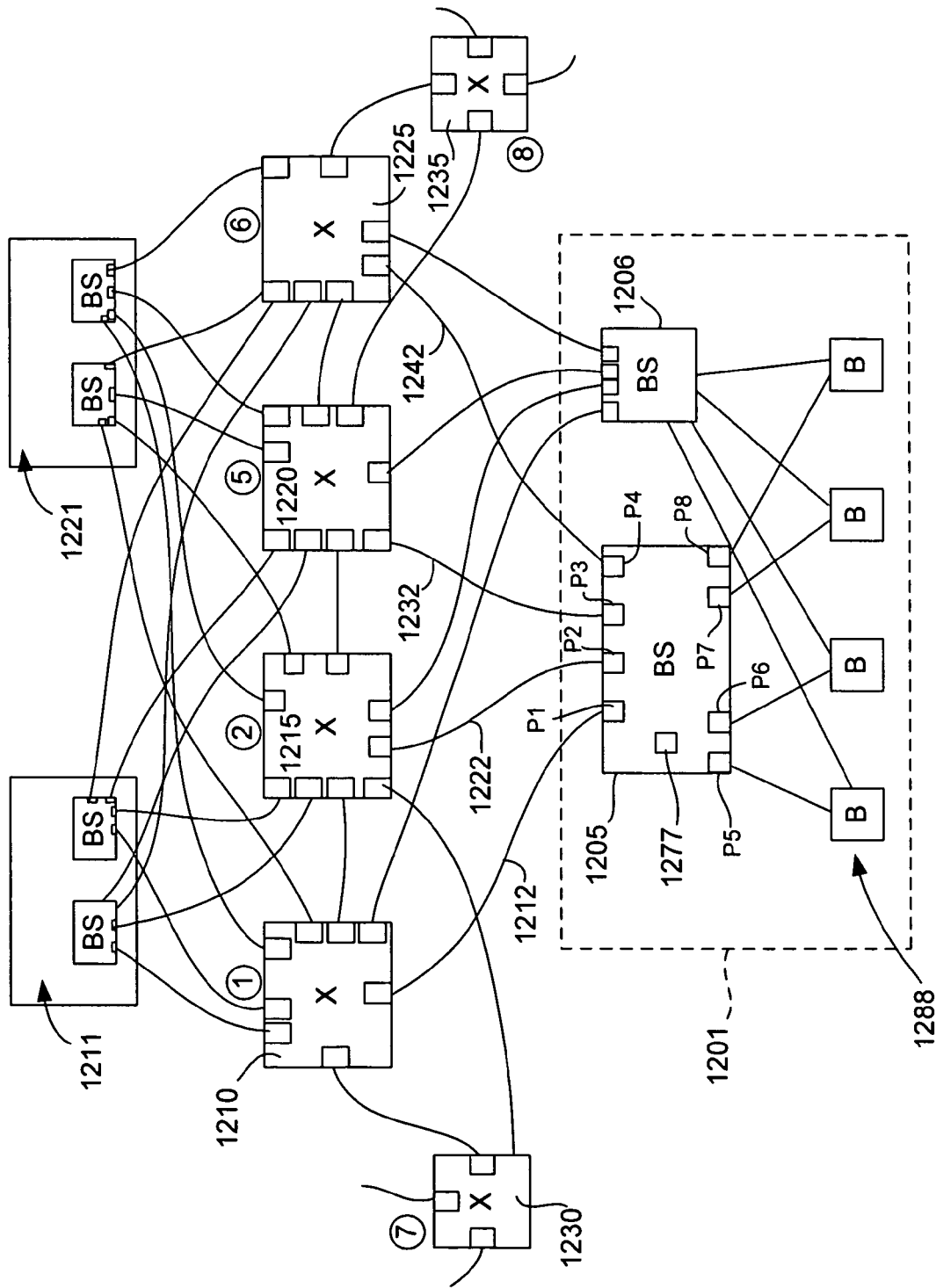
FIG. 12 is a network diagram for another implementation of the invention involving a virtual Domain_ID.

FIG. 12 illustrates blade server 1201 having blade switches 1205 and 1206, which are connected to fabric switches 1210, 1215, 1220 and 1225. Fabric switches 1210, 1215, 1220 and 1225 have Domain_IDs 1, 2, 5 and 6 in this example. Blade servers 1211 and 1221 are also connected to each of switches 1210, 1215, 1220 and 1225. In this example, switches 1210, 1215, 1220 and 1225 cooperate to form a virtual Domain_ID, which is virtual Domain_ID 10 in this example. It will be appreciated by those of skill in the art that more or fewer blade servers could be connected to each of switches 1210, 1215, 1220 and 1225.

Figure 13:
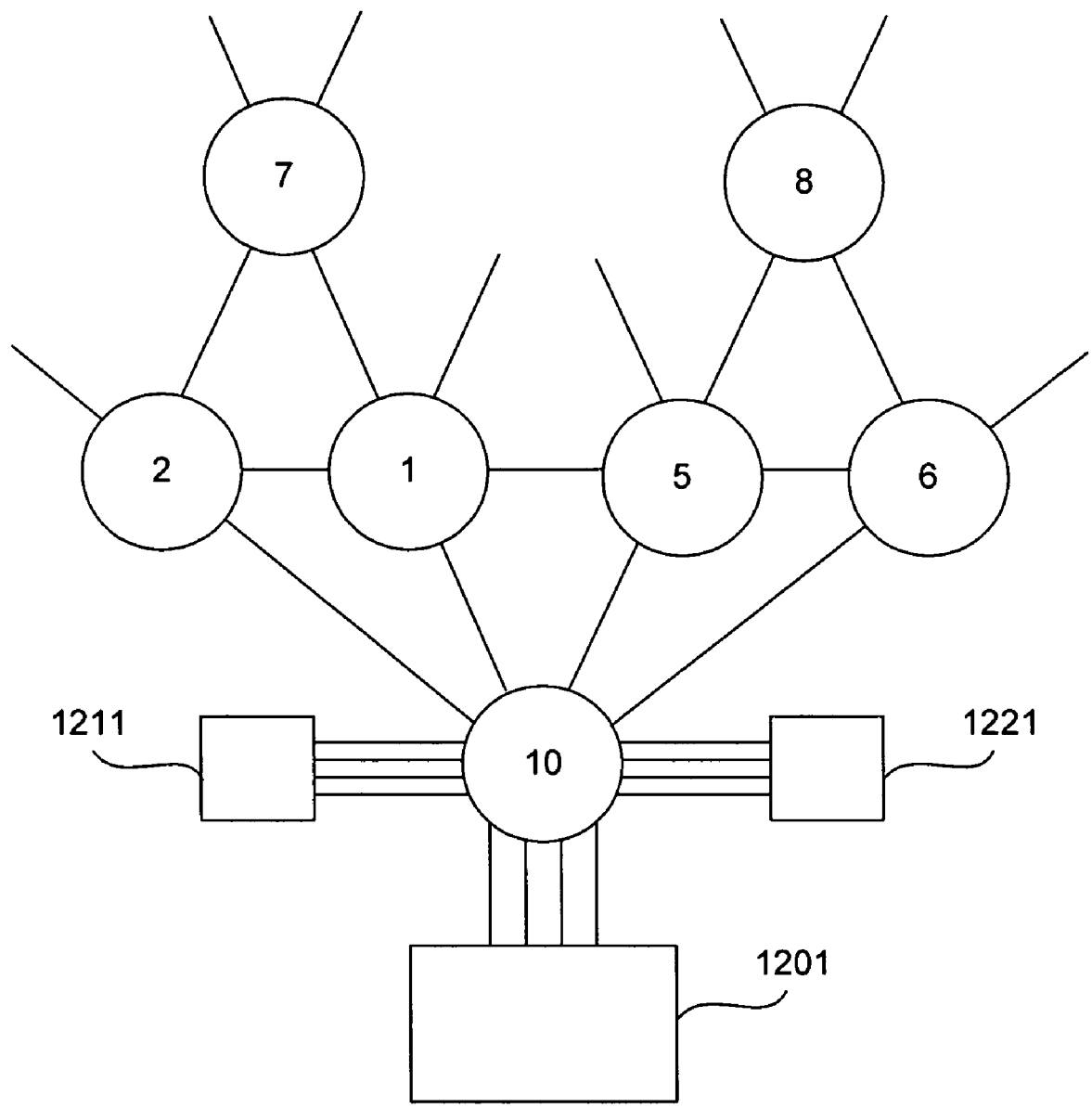
FIG. 13 is a logical diagram for the implementation of FIG. 12.

FIG. 13 illustrates the logical relationships between the Domain_IDs of FIG. 12 and virtual Domain_ID 10. Here, each of the blade switches of blade servers 1201, 1211 and 1221 operates as a satellite of a virtual switch having virtual Domain_ID 10. FIG. 13 represents the kind of topology that will be established by the FSPF routing protocol. As described in detail in U.S. patent application Ser. No. 10/374,490, each of the physical domains advertises an adjacency to virtual Domain_ID 10. One of the physical domains (e.g., domain 1) will advertise Domain_ID 10 as if it were assigned to a single switch.

Referring again to FIG. 12, it may be seen that the ports of switches 1210, 1215, 1220 and 1225 to which blade servers 1201, 1211 and 1221 are connected are depicted differently from the ports by which fabric switches are connected to other fabric switches: here, the former are shaded and the latter are not. This is meant to indicate that switches 1210, 1215, 1220 and 1225 need to know that frames sent or received on these ports (the shaded ports) should be treated differently from frames sent or received on other ports, because the shaded ports are associated with virtual Domain_ID 10. Moreover, each shaded port should be aware of the identity of the blade switch to which it is connected.

Figure 14:
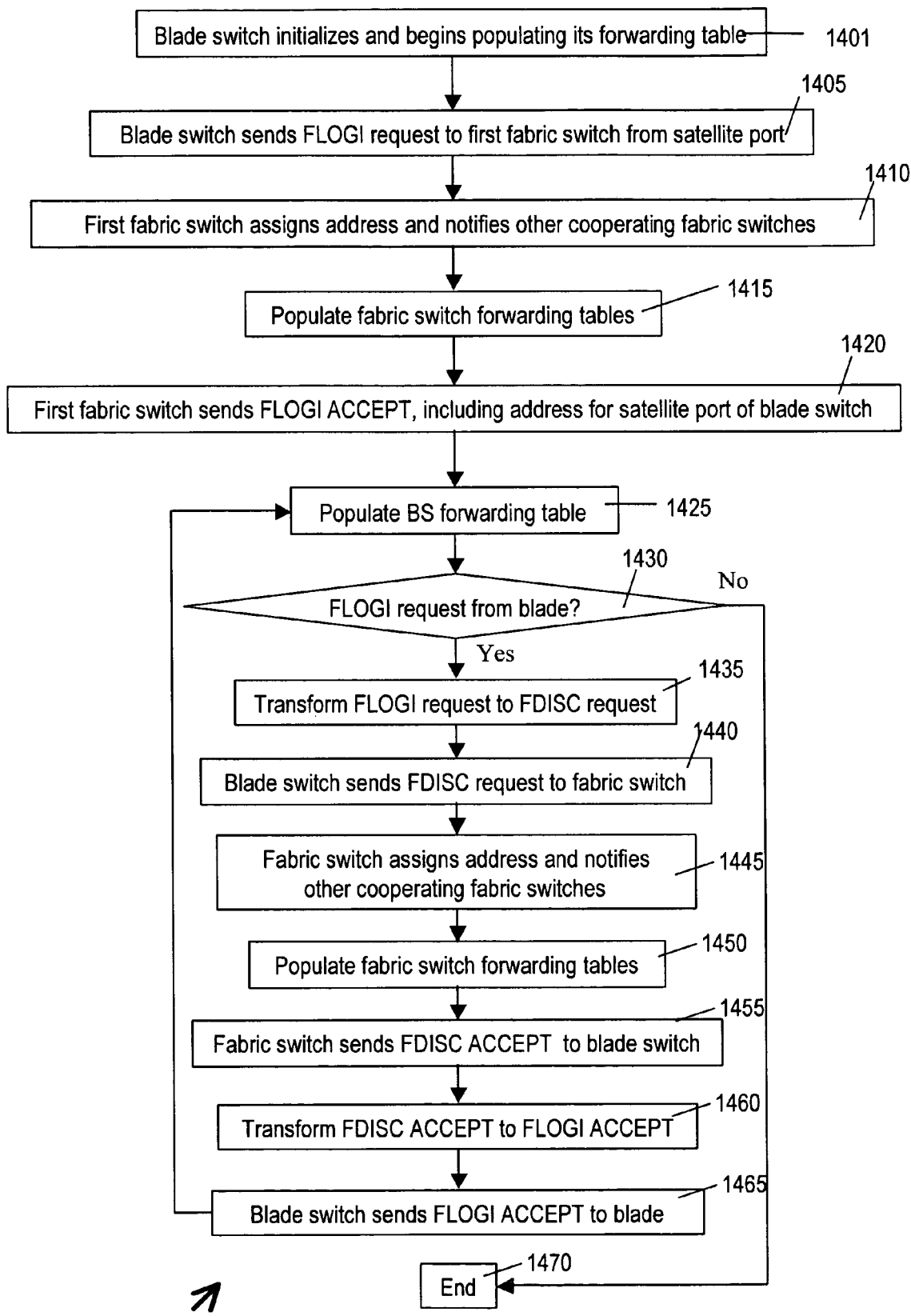
FIG. 14 is a flow chart that outlines method 1400 according to some aspects of the present invention.
Figure 15:
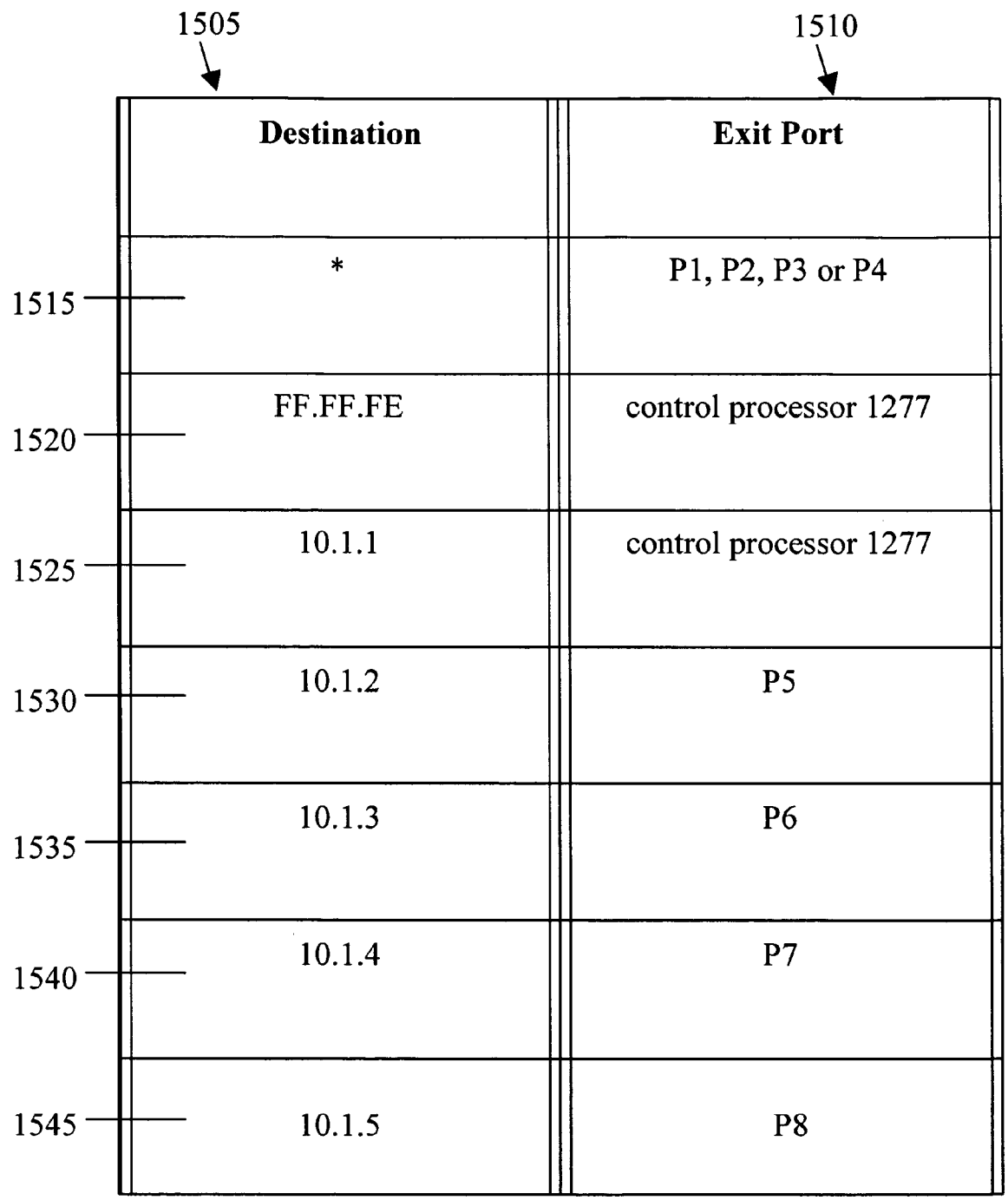
FIG. 15 is a forwarding table of a blade switch that has been populated according to method 1400.

FIG. 14 is a flow chart that describes the assignment of addresses to a blade server such as blade server 1201, according to some implementations of the present invention. In step 1401, a blade switch (here, blade switch 1205 of FIG. 12) initializes and begins to populate its forwarding table, which is forwarding table 1500 of FIG. 15 in this example. Entry 1520 associates destination address FF.FF.FE with control processor 1277, so that FLOGI requests from blades 1288 can be processed. Entry 1515 associates a "wild card" symbol in destination field 1505 with ports linked to fabric switches 1210, 1215, 1220 and 1225 (ports P1, P2, P3 and P4, respectively).

In some implementations of the invention, a single preferred satellite exit port is selected. Preferably, such implementations apply a policy for determining which port will become the new satellite exit port if the original satellite exit port fails (e.g., first use P1, but if it fails use P2, etc.). Those of skill in the art will realize that this policy is merely an example and that many other such policies could be implemented within the scope of the invention.

In step 1405, the blade switch sends a FLOGI request to one of cooperating fabric switches 1210, 1215, 1220 and 1225. The fabric switch assigns an address of the virtual Domain_ID (here, 10.1.1) and notifies the cooperating fabric switches of the address (step 1415), so that the fabric switches can populate their forwarding tables (step 1415) with the new address assignment. Then, the fabric switch returns an FDISC ACCEPT with the address (step 1420), which is used to populate entry 1525 of the blade switch's forwarding table 1500.

Blades are assigned addresses in a similar fashion. When it is determined in step 1430 that an FLOGI request is received from a blade (e.g., via port PS), the FLOGI request is transformed to an FDISC request having S_ID =0 (step 1435), which is forwarded to an attached fabric switch. (Step 1440). The fabric switch assigns an address and notifies the other cooperating fabric switches (step 1445), so that they can populate their forwarding tables (step 1450) and maintain the state of the virtual Domain_ID 10 prior to returning the address to the blade switch via an FDISC ACCEPT (step 1455).

The blade switch transforms the FDISC ACCEPT to an FLOGI ACCEPT (step 1460), sends the FLOGI ACCEPT to the requesting blade (step 1465) and populates the forwarding table with the address. In this example, blade switch 1205 received the FLOGI request on port P5, so the returned address (10.1.2) is associated with port P5 (forwarding table entry 1530). The addresses returned in response to FLOGI requests received on ports P6, P7 and P8, respectively, are 10.1.3, 10.1.4 and 10.1.5. Therefore, forwarding table entry 1535 associates destination address 10.1.3 with port P6, entry 1540 associates destination address 10.1.4 with port P7 and entry 1545 associates destination address 10.1.5 with port P8.

After initialization is completed, the blades may request additional N_Port_IDs by sending to the blade switch an FDISC request with S_ID =0. When the blade switch receives such a request, the FDISC request will be sent to the blade switch's control processor (here, processor 1277) according to entry 1520 of the forwarding table. The control processor will forward the FDISC request to an attached fabric switch. The fabric switch will assign an address and notify the other cooperating fabric switches, so that they can populate their forwarding tables and maintain the state of the virtual Domain_ID 10 prior to returning the additional address to the blade switch via an FDISC ACCEPT. The additional address will be added to the blade switch's forwarding table and associated with the port to which the requesting blade is attached. The FDISC ACCEPT will be then forwarded to the requesting blade.

A blade that acquired an additional N_Port_ID may release it by sending a LOGO from that N_Port_ID to the address FF.FF.FE. When the blade switch receives such a request, the LOGO request will be sent to the blade switch's control processor (here, processor 1277) according to entry 1520 of the forwarding table. The control processor will forward the LOGO request to an attached fabric switch. The LOGO request allows the fabric switch to remove the entry correspondent to that N_Port_ID from its forwarding table and to notify the other cooperating fabric switches, so that they can update their forwarding tables and maintain the state of the virtual Domain_ID 10. Upon receiving the LOGO response (LOGO ACCEPT) the blade switch will forward it to the requesting blade and then will remove the N_Port_ID previously assigned to that blade from its forwarding table.

When a blade goes down, the blade switch notifies an attached fabric switch by sending a LOGO from the address that was assigned to that blade and updates its forwarding table by removing the corresponding entry. The LOGO request allows the core switch to remove the entry corresponding to that blade from its forwarding table and to notify the other cooperating fabric switches, so that they can update their forwarding tables and maintain the state of the virtual Domain_ID 10.

The entry 1520 of forwarding table 1500 causes all requests sent by a blade to the FC address FF.FF.FE to be forwarded to the blade switch's control processor. While FLOGI, FDISC, and LOGO requests are detected and processed as described above, other types of requests are simply forwarded to an attached fabric switch, and the received responses are passed back to the requesting blades.

Because each of switches 1210, 1215, 1220 and 1225 are cooperating to maintain the state of the virtual Domain_ID 10 in each switch, the remaining switches can continue to provide Domain_ID 10 if one of switches 1210, 1215, 1220 and 1225 fails (or if a connection to one of these switches fails). Each of switches 1210, 1215, 1220 and 1225 knows in advance the identities of the other switches that form virtual Domain_ID 10, so that each of switches 1210, 1215, 1220 and 1225 knows which switches will be notified in step 1410 (and step 1445). This notification (and the corresponding update of the switch forwarding tables) preferably occurs before an address is provided in an ACCEPT to an FLOGI or an FDISC.

When a switch that was cooperating to form a virtual Domain_ID goes down and then comes back up, it must be updated with the current state of the virtual Domain_ID.

Although implementations involving virtual Domain_IDs provide additional advantages (e.g., increased robustness and potentially increased bandwidth), these implementations require novel functionality of both the blade switches and attached fabric switches. This could be advantageous in that it allows for added value to the fabric switch. However, the simpler case allows for blade servers configured according to the invention to be used with standard fabric switches.

Figure 16:
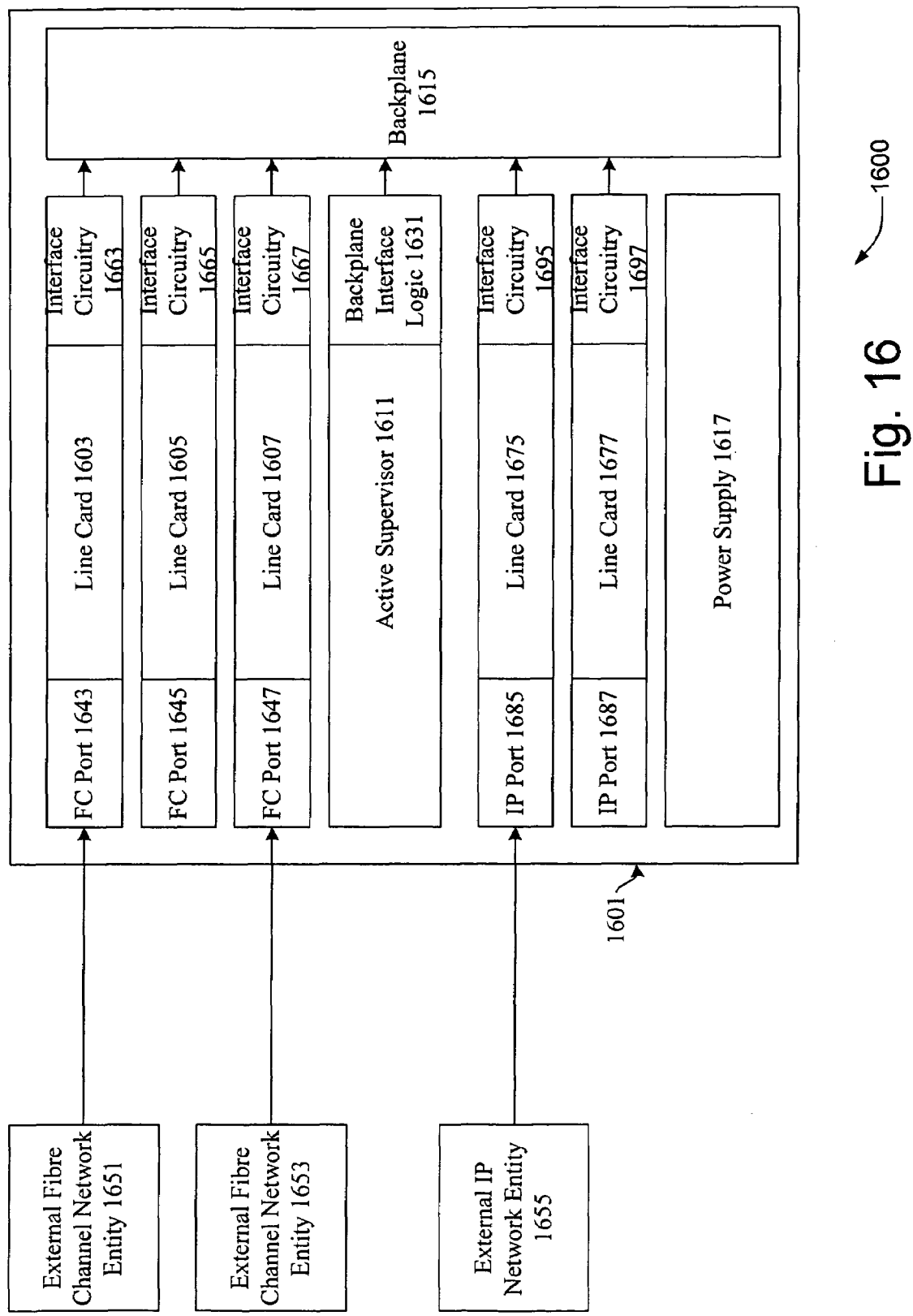
FIG. 16 is a block diagram of a fabric switch that can be configured according to some implementations of the invention.

FIG. 16 is a diagrammatic representation of one example of an FC switch that can be used to implement some techniques of the present invention. Although one particular configuration will be described, it should be noted that a wide variety of switch configurations are available. The switch 1601 may include one or more supervisors 1611 and power supply 1617. According to various embodiments, the supervisor 1611 has its own processor, memory, and storage resources.

Line cards 1603, 1605, and 1607 can communicate with an active supervisor 1611 through interface circuitry 1663, 1665, and 1667 and the backplane 1615. According to various embodiments, each line card includes a plurality of ports that can act as either input ports or output ports for communication with external FC network entities 1651 and 1653. The backplane 1615 can provide a communications channel for all traffic between line cards and supervisors. Individual line cards 1603 and 1607 can also be coupled to external FC network entities 1651 and 1653 through FC ports 1643 and 1647.

External FC network entities 1651 and 1653 can be nodes such as other FC switches, disks, RAIDS, tape libraries, or servers. The FC switch can also include line cards 1675 and 1677 with IP ports 1685 and 1687. In one example, IP port 1685 is coupled to an external IP network entity 1655. The line cards 1675 and 1677 also have interfaces 1695 and 1697 to the backplane 1615.

It should be noted that the switch can support any number of line cards and supervisors. In the embodiment shown, only a single supervisor is connected to the backplane 1615 and the single supervisor communicates with many different line cards. The active supervisor 1611 may be configured or designed to run a plurality of applications such as routing, domain manager, system manager, and utility applications. The supervisor may include one or more processors coupled to interfaces for communicating with other entities.

According to one embodiment, the routing application is configured to provide credits to a sender upon recognizing that a packet has been forwarded to a next hop. A utility application can be configured to track the number of buffers and the number of credits used. A domain manager application can be used to assign domains in the FC storage area network. Various supervisor applications may also be configured to provide functionality such as flow control, credit management, and quality of service (QoS) functionality for various FC protocol layers.

Although an exemplary switch has been described, the above-described embodiments may be implemented in a variety of network devices as well as in a variety of media. For instance, instructions and data for implementing the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

While the invention has been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of network protocols and architectures. It is therefore intended that the invention be interpreted to include all variations and equivalents that fall within the true spirit and scope of the present invention.

We claim:

1. A blade switch, comprising:
   a first port in communication with a first blade of a plurality of blades;
   a second port configured as an N_Port; and
   a logic device configured to do the following:
      receive a Fabric Log-in ("FLOGI") request from the first blade via the first port;
      convert the FLOGI request to a Fabric Discovery ("FDISC") request;
      forward the FDISC request to an F_Port of an attached fabric switch that is in communication with the second port;
      receive an FDISC ACCEPT from the attached fabric switch, the FDISC ACCEPT including the address for the first blade; and
   wherein F Ports of M cooperating fabric switches, including the attached fabric switch, are configured for communication with M N Ports of the blade switch, including the second port, wherein the M cooperating fabric switches form a virtual Domain ID and wherein the attached fabric switch determines a first address of the virtual Domain ID that will be used in the FDISC ACCEPT.

2. The blade switch of claim 1, wherein the logic device is configured to designate the N_Port as a default satellite port.

3. A network, comprising:
   a plurality of fabric switches; and
   a blade server comprising a blade switch and a plurality of blades, the blade switch having a first port in communication with a second port of a first fabric switch of the plurality of fabric switches, wherein the first port is configured as an N Port and the second port is configured as an F Port:
   wherein the blade switch comprises:
      a third port in communication with a first blade of the plurality of blades; and
      a logic device configured to do the following:
         receive a first FLOGI request from the first blade via the third port;
         convert the first FLOGI request to a first FDISC request; and
         forward the FDISC request to the second port of the first fabric switch via the first port;
   wherein the first fabric switch is configured to:
      receive the first FDISC request via the second port;
      determine a first address from a Domain ID that will be used in an FDISC ACCEPT responsive to the FDISC request;
      form the FDISC ACCEPT; and
      send the FDISC ACCEPT to the first port of the blade switch, the FDISC ACCEPT including the first address; and
   wherein F_Ports of M cooperating fabric switches, including the first fabric switch, are configured for communication with M N_Ports of the blade switch, wherein the M cooperating fabric switches form a virtual Domain_ID and wherein the first fabric switch determines a first address of the virtual Domain_ID that will be used in the FDISC ACCEPT.

4. The network of claim 3, wherein, prior to sending the FDISC ACCEPT, the first fabric switch notifies all other cooperating fabric switches of the first address that will be used in the FDISC ACCEPT.

5. A method for controlling a blade switch, comprising:
   receiving a first FLOGI request from a first blade of a blade server;
   converting the first FLOGI request to a first FDISC request; and
   obtaining a first address for the first blade via the first FDISC request the obtaining including:
   forwarding the first FDISC request from an N Port of the blade switch to an F Port of an attached fabric switch: and
   receiving an FDISC ACCEPT from the attached fabric switch, the FDISC ACCEPT including the first address for the first blade; and
   wherein F Ports of M cooperating fabric switches, including the attached fabric switch, are configured for communication with M N Ports of the blade switch, including the N port, wherein the M cooperating fabric switches form a virtual Domain ID and wherein the attached fabric switch determines a first address of the virtual Domain ID that will be used in the FDISC ACCEPT.

6. The method of claim 5, further comprising:
   receiving a $2^{nd}$ through $N^{th}$ FLOGI requests from $2^{nd}$ through $N^{th}$ blades;
   converting the $2^{nd}$ through $N^{th}$ requests to $2^{nd}$ through $N^{th}$ FDISC requests; and
   obtaining $2^{nd}$ through $N^{th}$ addresses for the $2^{nd}$ through $N^{th}$ blades via the $2^{nd}$ through $N^{th}$ FDISC requests.

7. The method of claim 6, further comprising the step of populating a forwarding table of the blade switch with the first through N$^{th}$ addresses.

8. The method of claim 5, further comprising the step of designating an N_Port to which a fabric switch is attached as a default satellite port.

9. The method of claim 5, further comprising the step of forming a virtual Domain_ID via cooperation between a plurality of fabric switches that are configured for communication with the blade switch, wherein the obtaining step comprises assigning an address from a virtual Domain_ID as the first address.

10. The method of claim 9, wherein the assigning step is performed by one of the plurality of fabric switches.

11. A method of controlling a blade server, comprising:
forming a virtual Domain_ID via cooperation between a plurality of fabric switches that are configured for communication with a blade switch of a blade server;
assigning a plurality of addresses from the virtual Domain_ID to the blade server; and
updating a forwarding table of each of the plurality of fabric switches according to the addresses assigned in the assigning step;
receiving, by an F_Port of one of the plurality of fabric switches, an address request from an N_Port of a blade switch:
determining an address from the virtual Domain_ID that will be used in a response to the address request;
notifying the other switches of the plurality of fabric switches of the address that will be used in the response to the address request; and
sending the response to the blade switch.

12. The method of claim 11, further comprising the step of designating at least one N_Port by which the plurality of fabric switches are attached to the blade switch as a default satellite port.

13. The method of claim 11, further comprising the step of designating each port by which the plurality of fabric switches are attached to the blade switch as a default satellite port.

14. The method of claim 11, wherein the request is an FLOGI request or an FDISC request.

15. A blade switch, comprising:
means for receiving a first FLOGI request from a first blade of a blade server;
means for converting the first FLOGI request to a first FDISC request; and
means for obtaining a first address for the first blade via the first FDISC request the means for obtaining including:
means for forwarding the first FDISC request from an N Port of the blade switch to an F_Port of an attached fabric switch;
means for receiving an FDISC ACCEPT from the attached fabric switch, the FDISC ACCEPT including the first address for the first blade; and
wherein F_Ports of M cooperating fabric switches, including the attached fabric switch, are configured for communication with M N Ports of the blade switch, including the N port, wherein the M cooperating fabric switches form a virtual Domain ID and wherein the attached fabric switch determines a first address of the virtual Domain ID that will be used in the FDISC ACCEPT.

16. A blade server, comprising:
a plurality of blades; and
a blade switch, comprising:
a first port in communication with a first blade of the plurality of blades;
a second port configured as an N_Port and
a logic device configured to do the following:
receive a first FLOGI request from the first blade via the first port;
convert the first FLOGI request to a first FDISC request;
forward the FDISC request to an F_Port of a fabric switch that is in communication with the second port;
obtain a first address from the fabric switch for the first blade via the first FDISC request; and
wherein F_Ports of M cooperating fabric switches are configured for
communication with M N Ports of the blade switch, including the second port,
wherein the M cooperating fabric switches form a virtual Domain ID and wherein the fabric switch determines a first address of the virtual Domain ID that will be used in an FDISC ACCEPT responsive to the FDISC request.

17. A network management method, comprising:
forming a connection between a first port of a blade switch of a blade server and a second port of a Fibre Channel fabric switch;
configuring the blade switch as a logical extension of the Fibre Channel fabric switch, wherein the configuring step comprises assigning addresses from a Domain_ID of the fabric switch to blades of the blade server;
receiving, by the second port of the Fibre Channel fabric switch, an address request from the first port of the blade switch;
determining an address from the Domain_ID that will be used in a response to the address request;
notifying the other switches of the plurality of fabric switches of the address that will be used in the response to the address request; and
sending the response to the blade switch.

18. The network management method of claim 17, wherein the Domain_ID comprises a virtual Domain_ID.

* * * * *